(12) United States Patent
Chandra et al.

(10) Patent No.: US 11,625,812 B2
(45) Date of Patent: Apr. 11, 2023

(54) RECOVERING OCCLUDED IMAGE DATA USING MACHINE LEARNING

(71) Applicant: Microsoft Technology Licensing, LLC, Redmond, WA (US)

(72) Inventors: Ranveer Chandra, Kirkland, WA (US); Peder Andreas Olsen, Redmond, WA (US); Mingmin Zhao, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/786,257

(22) Filed: Feb. 10, 2020

(65) Prior Publication Data

US 2021/0133936 A1 May 6, 2021

Related U.S. Application Data

(60) Provisional application No. 62/929,734, filed on Nov. 1, 2019.

(51) Int. Cl.
*G06K 9/62* (2022.01)
*G06T 5/00* (2006.01)
(Continued)

(52) U.S. Cl.
CPC ............ *G06T 5/005* (2013.01); *G06K 9/6256* (2013.01); *G06N 3/0454* (2013.01); *G06N 3/08* (2013.01);
(Continued)

(58) Field of Classification Search
CPC . G06T 5/005; G06T 5/50; G06T 2207/10044; G06T 2207/10048;
(Continued)

(56) References Cited

U.S. PATENT DOCUMENTS 9,875,428 B2 * 1/2018 Ramamurthy ....... G06K 9/6256
10,878,588 B2 * 12/2020 Yang .......................... G06T 5/50
(Continued)

OTHER PUBLICATIONS

J. D. Bermudez et al., "SAR To Optical Image Synthesis for Cloud Removal With Generative Adversarial Networks", ISPRS Annals of the Photogrammetry, Remote Sensing and Spatial Information Sciences, vol. IV-1, 2018 ISPRS TC I Mid-term Symposium "Innovative Sensing—From Sensors to Methods and Applications", 10-12.*
(Continued)

*Primary Examiner* — Samir A Ahmed
(74) *Attorney, Agent, or Firm* — Alleman Hall Creasman & Tuttle LLP

(57) ABSTRACT

Examples disclosed herein are related to using a machine learning model to generate image data. One example provides a system, comprising one or more processors, and storage comprising instructions executable by the one or more processors to obtain image data comprising an image with unoccluded features, apply a mask to the unoccluded features in the image to form partial observation training data comprising a masked region that obscures at least a portion of the unoccluded features, and train a machine learning model comprising a generator and a discriminator at least in part by generating image data for the masked region and comparing the image data generated for the masked region to the image with unoccluded features.

16 Claims, 19 Drawing Sheets

(51) Int. Cl.
  *G06T 5/50*    (2006.01)
  *G06N 3/08*    (2023.01)
  *G06N 3/04*    (2023.01)
  *G01S 13/90*   (2006.01)

(52) U.S. Cl.
  CPC ............ *G06T 5/50* (2013.01); *G01S 13/9021* (2019.05); *G06T 2207/10036* (2013.01); *G06T 2207/10044* (2013.01); *G06T 2207/10048* (2013.01); *G06T 2207/20081* (2013.01); *G06T 2207/20084* (2013.01)

(58) Field of Classification Search
  CPC . G06T 2207/10036; G06T 2207/20084; G06T 2207/20081; G06T 2207/10024; G06T 2207/30181; G06K 9/6256; G06K 2009/00644; G06K 9/0063; G06N 3/08; G06N 3/0454; G06N 3/0472; G01S 13/9021; G06V 10/273; G06V 10/774; G06V 10/82; G06V 20/13; G06V 20/194
  See application file for complete search history.

(56) References Cited

U.S. PATENT DOCUMENTS

| | | | | |
|---|---|---|---|---|
| 2009/0232349 | A1* | 9/2009 | Moses | G06T 5/006 382/100 |
| 2016/0012314 | A1* | 1/2016 | Ramamurthy | G06K 9/6244 382/160 |
| 2019/0297326 | A1* | 9/2019 | Reda | G06T 5/20 |
| 2019/0392596 | A1* | 12/2019 | Yang | G06T 5/005 |
| 2020/0143519 | A1* | 5/2020 | Gordon | H04N 5/217 |
| 2021/0097311 | A1* | 4/2021 | McBeth | G08G 1/0129 |

OTHER PUBLICATIONS

Peilun Li et al., "Semantic-aware Grad-GAN for Virtual-to-Real Urban Scene Adaption", arXiv:1801.01726v2 [cs.CV] Jul. 14, 2018.*

Hoo-Chang Shin et al., "Medical Image Synthesis for Data Augmentation and Anonymization using Generative Adversarial Networks", arXiv:1807.10225v2 [cs.CV] Sep. 13, 2018.*

Wang, et al., "ESRGAN: Enhanced Super-Resolution Generative Adversarial Networks", In Proceedings of the European Conference on Computer Vision Workshops, Sep. 8, 2018, 16 Pages.

Grohnfeldt, Claas, "A Conditional Generative Adversarial Network to Fuse Sar And Multi spectral Optical Data For Cloud Removal From Sentinel-2 Images", In Publication of IGARSS 2018—2018 IEEE International Geoscience and Remote Sensing Symposium, Jul. 22, 2018, pp. 1726-1729.

Enomoto, Kenji, "Filmy Cloud Removal on Satellite Imagery with Multispectral Conditional Generative Adversarial Nets", In Repository of arXiv:1710.04835, Oct. 13, 2017, 9 Pages.

"International Search Report and Written Opinion Issued in PCT Application No. PCT/US20/056216", dated Jan. 18, 2021, 11 Pages.

Isola, et al., "Image-to-Image Translation with Conditional Adversarial Networks", In Repository of arXiv:1611.070043, Nov. 26, 2018, 17 Pages.

Yu, et al., "Free-Form Image Inpainting with Gated Convolution", In Repository of arXiv:1806.03589v2, Oct. 22, 2019, 17 Pages.

Yu, et al., "Generative Image Inpainting with Contextual Attention", In Repository of arXiv:1801.07892v2, Mar. 21, 2018, 15 Pages.

Liu, et al., "StfNet: A Two-Stream Convolutional Neural Network for Spatiotemporal Image Fusion", In Journal of Transactions on Geoscience and Remote Sensing, vol. 57, Issue 9, Sep. 1, 2019, pp. 6552-6564.

"International Search Report & Written Opinion issued in PCT Application No. PCT/US22/020098", dated Sep. 8, 2022, 20 Pages.

"Invitation To Pay Additional Fee Issued In PCT Application No. PCT/US22/020098", dated Jul. 18, 2022, 13 Pages.

Song, et al., "Spatiotemporal Satellite Image Fusion Using Deep Convolutional Neural Networks", In Journal of Selected Topics in Applied Earth Observations and Remote Sensing, vol. 11, Issue 3, Mar. 1, 2018, pp. 821-829.

Zhang, et al., "Remote Sensing Image Spatiotemporal Fusion Using a Generative Adversarial Network", In Journal of Transactions on Geoscience and Remote Sensing, vol. 59, Issue 5, May 2021, pp. 4273-4286.

Wang, et al., "ESRGAN: Enhanced Super-Resolution Generative Adversarial Networks Supplementary File," In Repository of arXiv:1809.002192, Sep. 17, 2018, pp. 1-23.

\* cited by examiner

RECOVERING OCCLUDED IMAGE DATA USING MACHINE LEARNING

CROSS REFERENCE TO RELATED APPLICATIONS

This application claims priority to U.S. Provisional Patent Application Ser. No. 62/929,734, filed Nov. 1, 2019, the entirety of which is hereby incorporated herein by reference for all purposes.

BACKGROUND

Machine learning may be used to perform various image processing tasks. For example, machine learning may be used to perform image inpainting, which is the generation of data to replace missing or corrupt data in an image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to using a machine learning model to recover occluded image data. One example provides a system comprising one or more processors, and storage comprising instructions executable by the one or more processors to obtain image data comprising an image with unoccluded features, apply a mask to the unoccluded features in the image to form partial observation training data comprising a masked region that obscures at least a portion of the unoccluded features, and train a machine learning model comprising a generator and a discriminator at least in part by generating image data for the masked region and comparing the image data generated for the masked region to the image with unoccluded features.

Another example provides a system comprising one or more processors, and storage comprising instructions executable by the one or more processors to receive training data comprising satellite optical images and radar image data for a geographical area, the satellite images comprising occluded image data due to clouds in the image data and also comprising unoccluded image data, apply a mask to the unoccluded image data to form partial observation training data comprising a masked region to simulate clouds blocking the unoccluded image data, and train a machine learning model comprising a generator and a discriminator at least in part by generating image data for the masked region based upon corresponding image data acquired via an imaging technique that penetrates clouds, and comparing the image data generated for the masked region with the unoccluded image data.

Another example provides a system comprising one or more processors, and storage comprising instructions executable by the one or more processors to receive a first set of images of a geographical area taken over a period of time, the first set of images comprising optical images with at least some occluded image data due to clouds, receive a second set of images of the geographical area taken over the period of time, the second set of images being acquired via an imaging technique that penetrates clouds, and based on the first set of images and the second set of images, generate a set of predicted optical images of the geographical area using a machine learning model, the set of predicted optical images comprising generated image data for the occluded features.

DETAILED DESCRIPTION

Currently, earth observation satellites travel around the Earth and continuously collect images of the planet via various imaging techniques, including optical and radar. Satellite imagery has many applications, such as in agriculture, environmental monitoring, and mapping. Organizations such as the National Aeronautics and Space Administration (NASA) and the European Space Agency (ESA) provide public access to satellite data. One challenge in satellite mapping of the Earth using optical or multispectral satellite data is that much of the view of the Earth's surface is frequently obscured by clouds, which results in occluded images. Further, even when not completely occluded, thin clouds, haze, and cloud shadows may produce pixel noise and corrupt the images. As a result, for a given geographic area, relatively few cloud-free optical or multispectral satellite images may be obtained for a geographic area over a period of time, which limits the potential uses of such satellite imagery. The ability to obtain cloud-free Earth observations more frequently may enhance existing applications and create new opportunities for tracking and responding to changes on the planet.

Figure 1:
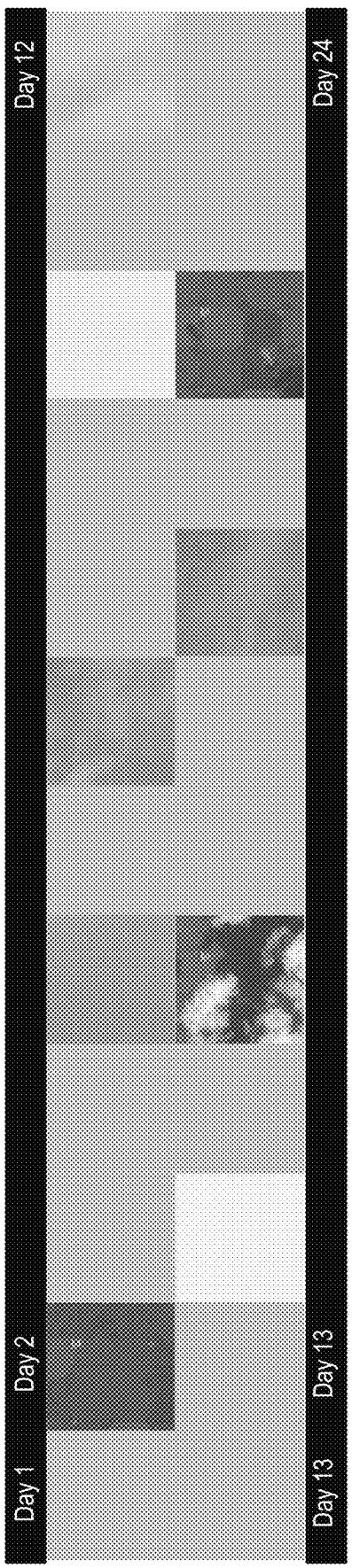
FIG. 1 shows example satellite optical image data acquired for a geographic area over a period of time.

One possible method for obtaining more frequent unoccluded satellite imagery is digital inpainting (mentioned above). Digital inpainting utilizes computer algorithms to fill in missing pixels of an image or a video. However, while inpainting may be useful for reconstructing small regions of missing image data, inpainting may be impractical and inaccurate for reconstructing satellite image data, as often times a satellite image may be mostly or completely occluded by clouds. As such, while the resulting image may be plausible, it also may be inaccurate. FIG. 1 shows an example set of satellite optical image data obtained for a geographic area over the course of twenty-four days. As depicted, a majority of the days produce at least partially occluded, if not completely occluded or unavailable, image data results, due to cloud cover and the satellite orbit path.

Accordingly, examples are disclosed that provide for the generation of reduced noise (e.g. cloud-free) optical and multispectral imagery of the Earth on a frequent basis that may be more accurate than traditional inpainting techniques. Briefly, the disclosed examples disclosed herein utilize satellite images (optical and/or multispectral) as well as radar data (e.g. SAR (synthetic-aperture radar) data) to generate optical image data for replacing occluded image data, as opposed to methods that utilize optical image data alone. As described in more detail below, the disclosed examples use a machine learning model, such as a generative adversarial network (GAN), to reconstruct occluded image data using the occluded image data and corresponding radar data. The disclosed examples use both the time signal for radar data as well as of optical satellite data to reconstruct the ground observation. The disclosed methods may also be applied to optical bands other than RGB, for example near infrared (NIR), short-wave infrared (SWIR), and Red Edge. Any suitable data that has at least a few unoccluded pixels in a time window may be used to reconstruct missing pixels in the scene.

Figure 2:
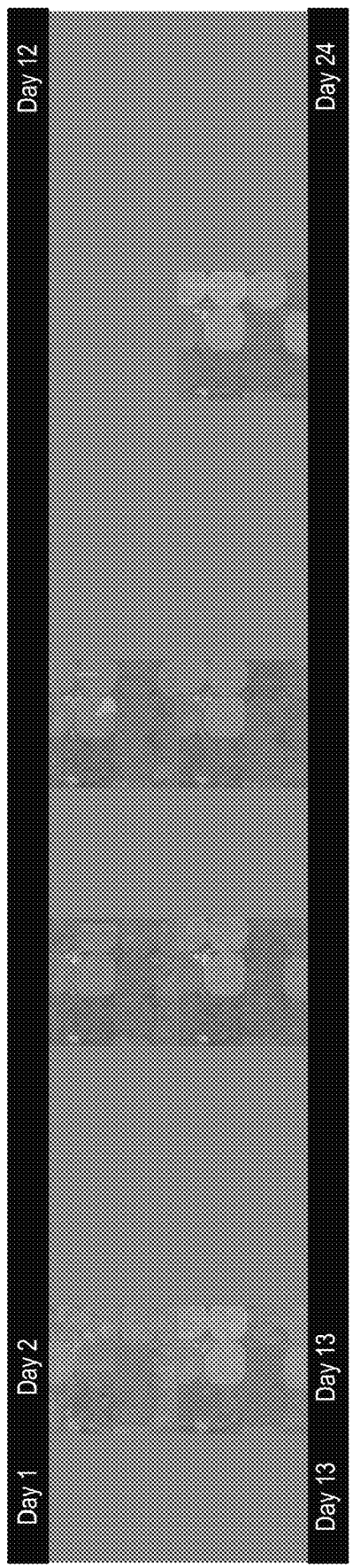
FIG. 2 shows example satellite radar data acquired for the geographic area shown in FIG. 1 over a period of time.

Unlike optical image data and multispectral image data, radar data can penetrate clouds, and can be obtained at night. However, radar data may be more difficult to visualize and interpret than optical image data or multispectral data. Thus, using both satellite image data and satellite radar data as inputs to a machine learning function may allow for the accurate generation of replacement optical or multispectral image data based upon the radar data, which may thereby allow the accurate recovery of the occluded image data. FIG. 2 shows an example set of SAR data of the same geographic area shown in FIG. 1. As can be seen, the SAR data is not occluded by clouds. It is understood that on some days, optical/multispectral image data and/or SAR data may not be available, such as due to the satellite not flying over that particular area on those particular days, the satellite being out of commission, or for other reasons.

Figure 3:
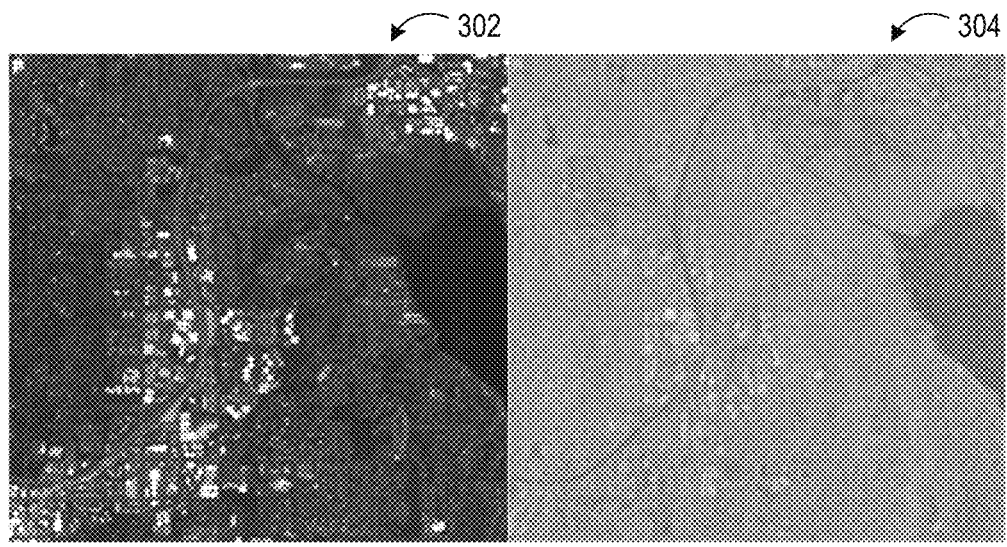
FIG. 3 shows a satellite optical image and a satellite radar image for a geographic area on a first day.
Figure 4:
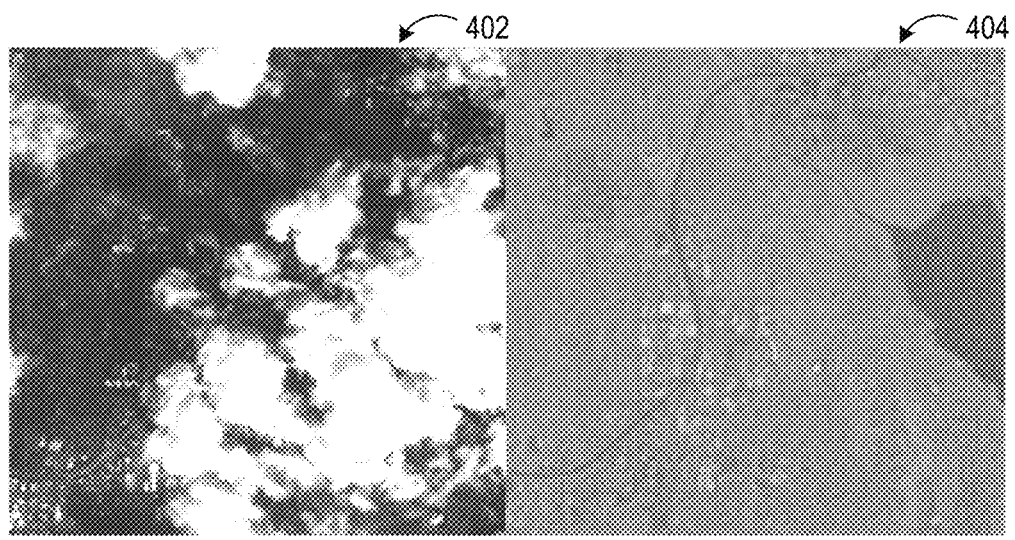
FIG. 4 shows a satellite optical image and a satellite radar image for the geographic area of FIG. 3 on a second day.

As another example, FIG. 3 shows an example satellite optical image 302 versus a satellite radar image 304 of an area in Redmond, Wash., USA, on a first day, while FIG. 4 shows an example satellite optical image 402 versus a satellite radar image 404 of the same area on a second day. The optical image 302 shows a clear image of the geographic area, whereas the optical image 402 comprises clouds occluding portions of the geographic area. In contrast, radar images 304 and 404 are not occluded by clouds in either instance.

Figure 5:
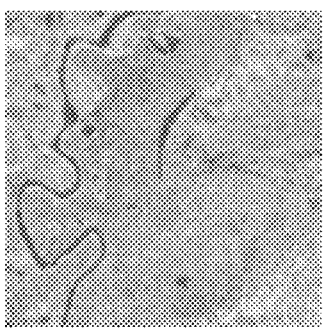
FIG. 5 shows example satellite radar data acquired for a geographic area over a period of time.
Figure 5:
Figure 5:
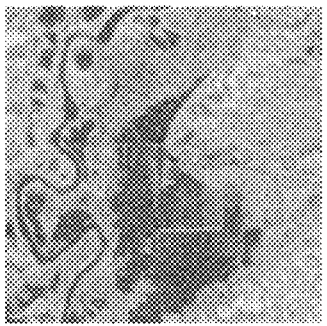
Figure 5:
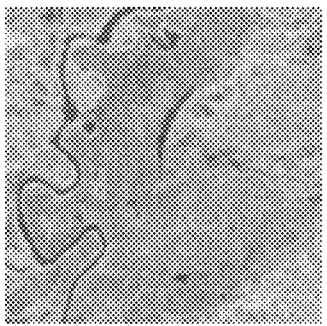
Figure 6:
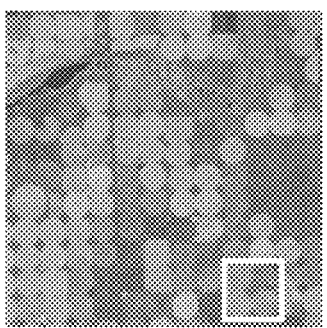
FIG. 6 shows example satellite radar data acquired for another geographic area over a period of time.
Figure 6:
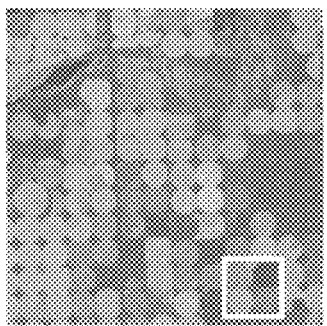
Figure 6:
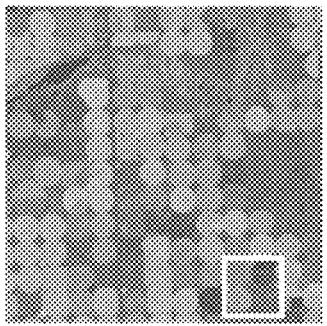
Figure 6:
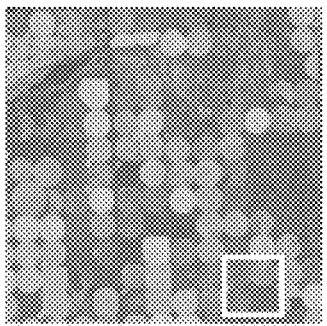

FIG. 5 shows example SAR data acquired for an area of Carnation, Wash. during January-February 2018 before and after a flood, as depicted on February $5^{th}$. Further, FIG. 6 shows example SAR data acquired for an area of Quincy, starting June 2019, showing changes in circular fields due to irrigation patterns. As shown, SAR data may capture potentially dramatic changes over time due to natural disasters and human activities that may be missed by occluded optical image data.

As mentioned above, a GAN may be used to generate image data. A GAN is a type of machine learning system in which two neural networks, a generator and a discriminator, are trained against each other to generate novel data based on a training data set. The generator generates natural-looking image data, and the discriminator decides whether image data generated by the generator is accurate. The use of radar data, which can see through clouds but also can be difficult to visualize, may help a GAN generate and discriminate accurate image data to replace occluded image data in a satellite optical image or multispectral image. Other forms of imaging not affected by clouds may be used in addition to, or alternatively to, radar data. Examples include any infrared and microwave imagery that is able to penetrate clouds.

Figure 7:
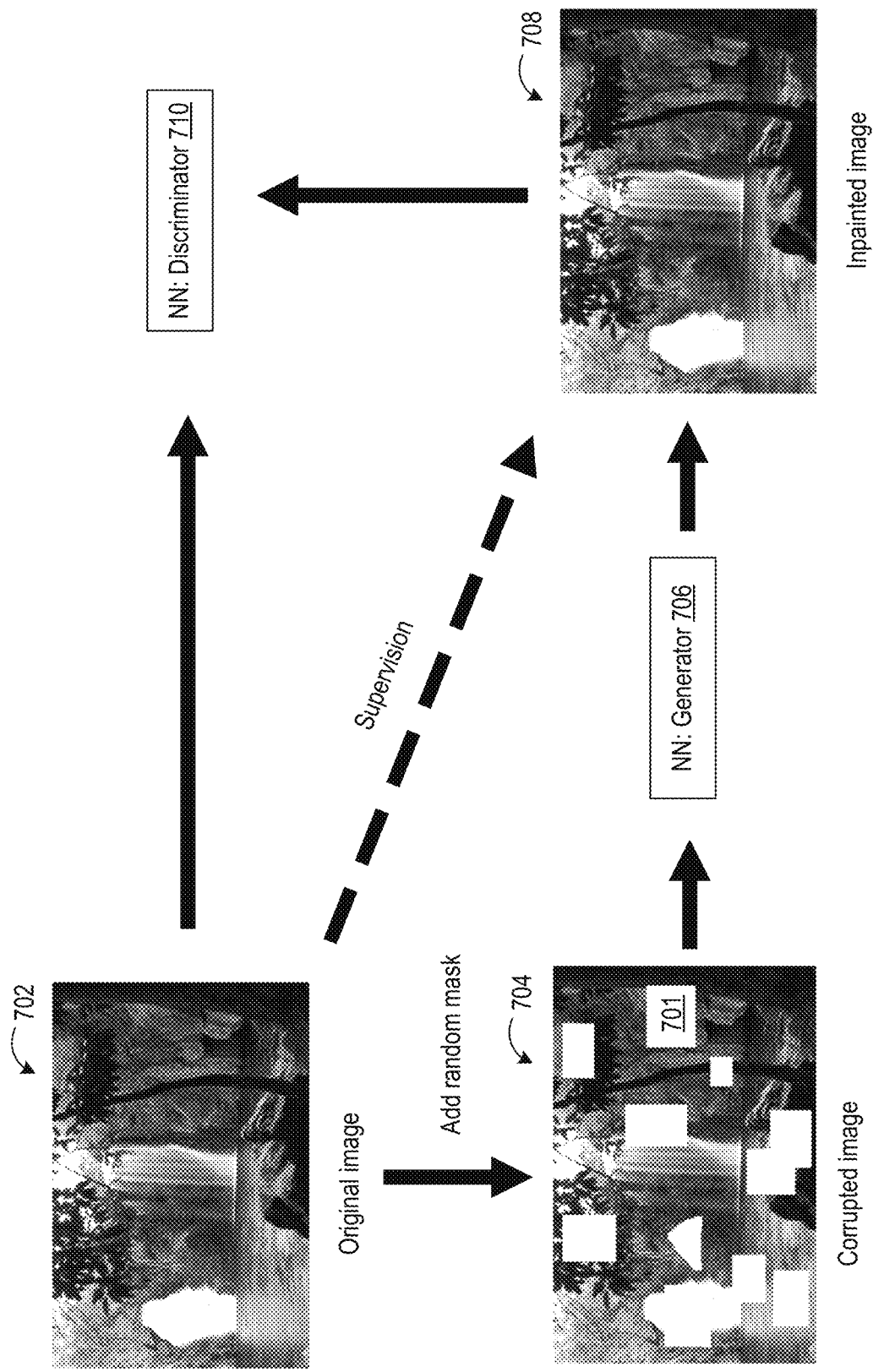
FIG. 7 schematically illustrates use of a generative adversarial network (GAN) to perform image inpainting.

FIG. 7 schematically illustrates the training of a GAN to generate image data to replace missing or deteriorated image data in an image via inpainting. In this schematic example, occluded image data is generated by the application of a random mask 701 on an original image 702 to form a corrupted image 704. The corrupted image 704 is input into the neural network generator 706, which generates novel data to create an inpainted image 708 with image data that replaces the data covered by the mask. The inpainted image 708 is then input to the neural network discriminator 710 for comparison to the original image 702 in a supervised training process to train the generator and discriminator networks to produce visually realistic and semantically plausible images.

However, a GAN is typically trained based on full images. Difficulties may be encountered when training a GAN using satellite image data with clouds obscuring the view of the Earth in the image data, as the risk of generating inaccurate (but realistic) image data may increase. Further, because cloud-free images are rare in satellite images of some geographic areas, GAN trained with such images will generate images having clouds.

Figure 8:
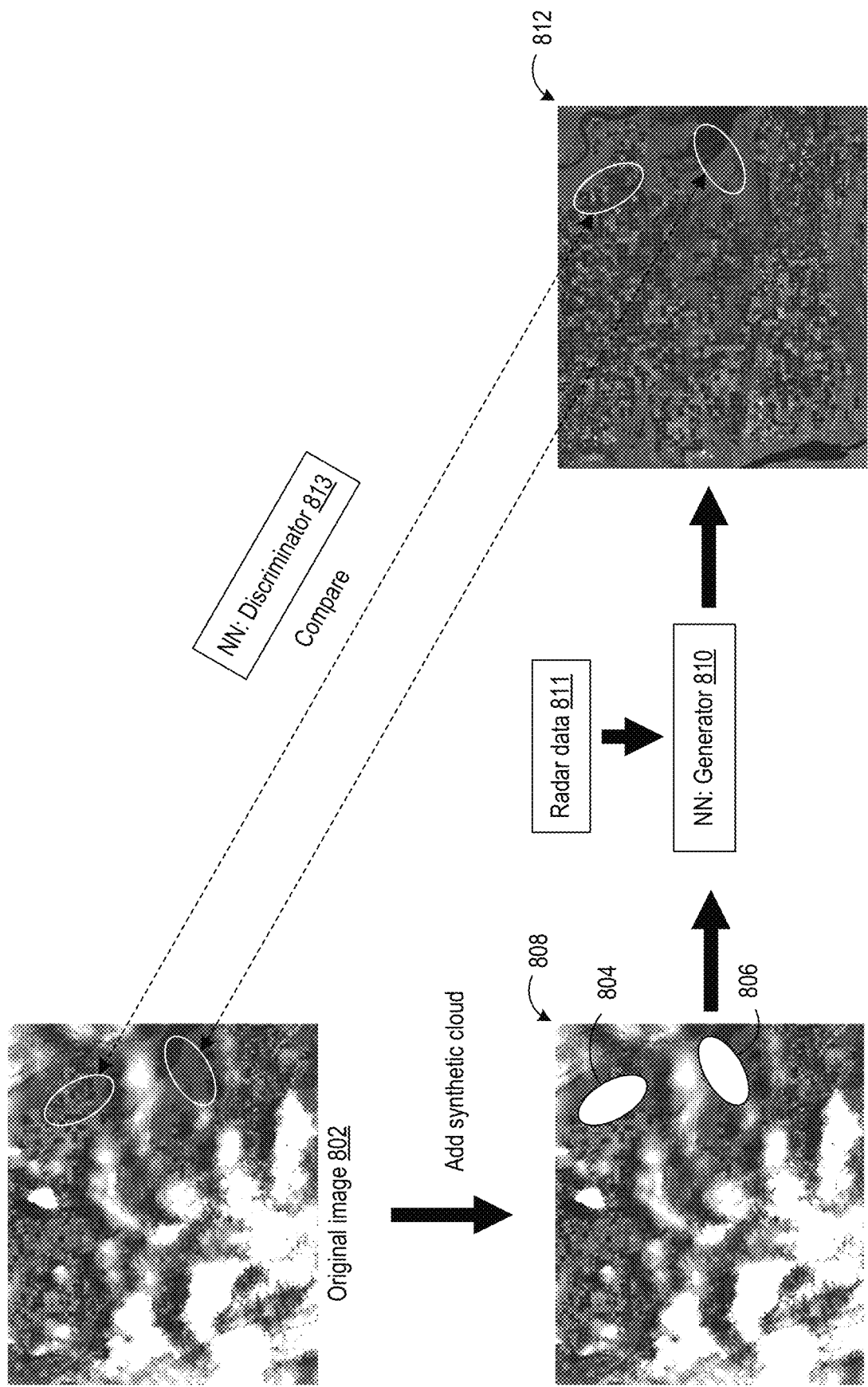
FIG. 8 schematically shows an example method of training a partial observation GAN (POGAN) using satellite optical image data to which a mask has been applied.

Accordingly, the disclosed examples utilize training data modified to form partial observation training data to train a GAN. This technique may be referred to hereafter as "POGAN," for "partial observation generative adversarial network." The POGAN technique involves training a machine learning model based on partial images, rather than full images. FIG. 8 shows an example method in which a POGAN is applied to satellite optical image data. Given an original satellite image 802, which includes clear image data (i.e. not unsuitably occluded by clouds and/or pixel noise) as well as occluded image data due to clouds and/or pixel noise, random masks are applied as synthetic clouds to form masked regions 804, 806 that obscure portions of originally clear features in the satellite image 802. The masked image 808 is then input to a generator 810, along with radar data 811 such as SAR data, to generate image data for the masked regions and the occluded features. The generated image data 812 for the masked regions is then compared to the clear features from the original image at the discriminator 813. In this manner, the GAN is trained to understand the relationship between radar data and occluded image data. This may help to train the GAN to produce realistic looking image data for the occluded features covered by clouds. Then, in a later deployment phase that follows the initial training phase, the trained GAN can be used to generate image data for an occluded feature in deployment-phase satellite image data using deployment-phase satellite radar data corresponding to the satellite image data. In this manner, the applied masks used in the training phase simulate occluding features in deployment-phase image data, such as clouds, commonly encountered in deployment-phase satellite optical image data.

Figure 9:
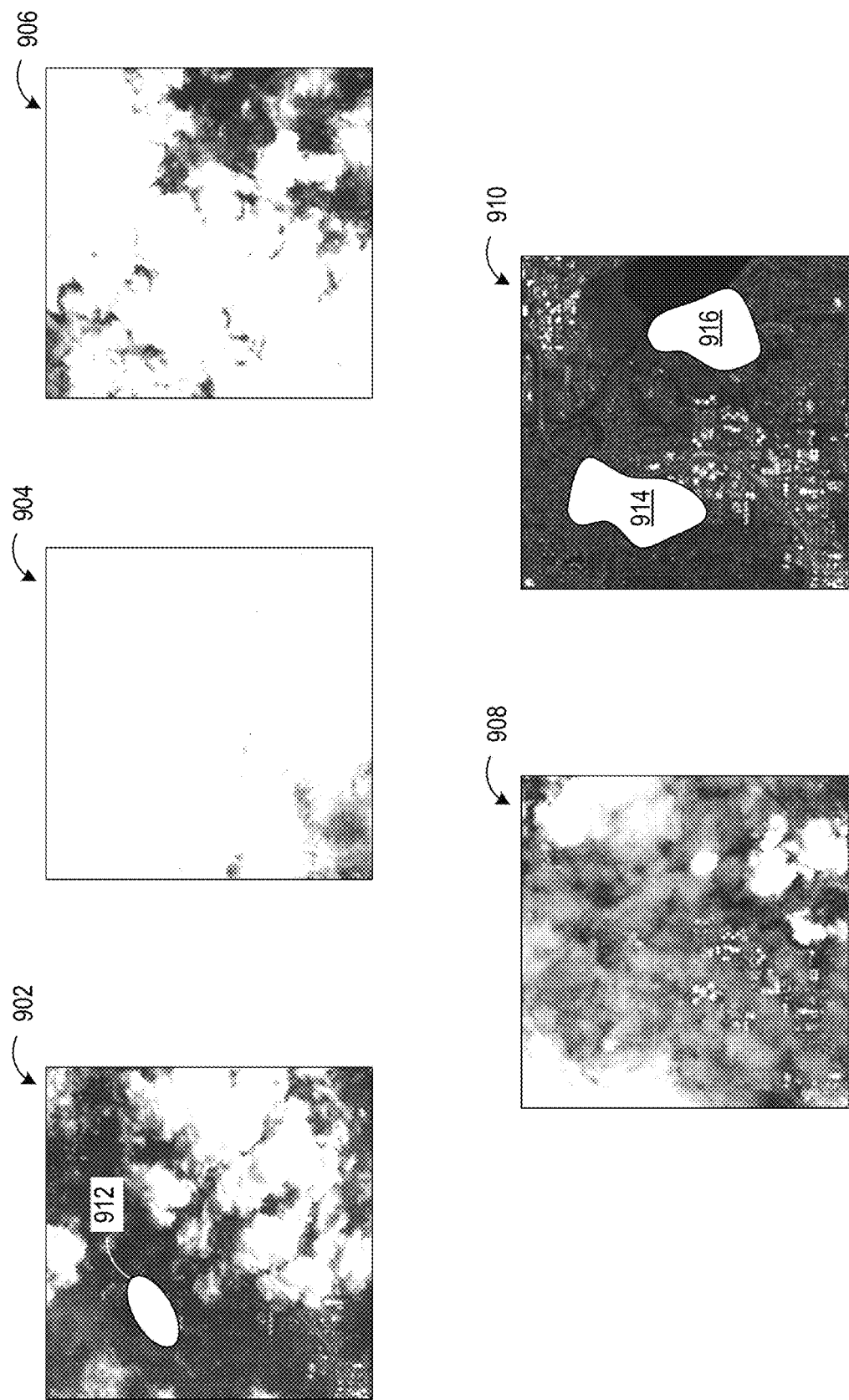
FIG. 9 shows example satellite optical image data acquired for a geographic area at different times, with some images having random masks applied as synthetic clouds.

FIG. 9 shows example satellite optical images 902, 904, 906, 908 and 910 acquired for a geographic area at different times, and illustrates the generation of POGAN training data by applying masks to the satellite optical images. Masks simulating clouds may be added to portions of images that do not already contain real clouds. Thus, images at 902 and 910 depict random masks 912, 914, and 916 applied as synthetic clouds. Optical images like 904, which is substantially covered by clouds, may still be used in training a GAN. However, because image 904 lacks unobscured image data, synthetic clouds are not applied. In other examples, images substantially covered by clouds may be filtered out from the training dataset.

In some examples, the GAN used for implementing an example POGAN may comprise a neural attention mechanism. The neural attention mechanism allows a neural network to capture more contextual information from distant locations in an image than a traditional convolutional network, without the same memory and computation requirements of a fully connected network. The use of the neural attention mechanism may offer similar memory and compute advantages as convolution, while having an effectivity closer to that of fully-connected networks.

Figure 10:
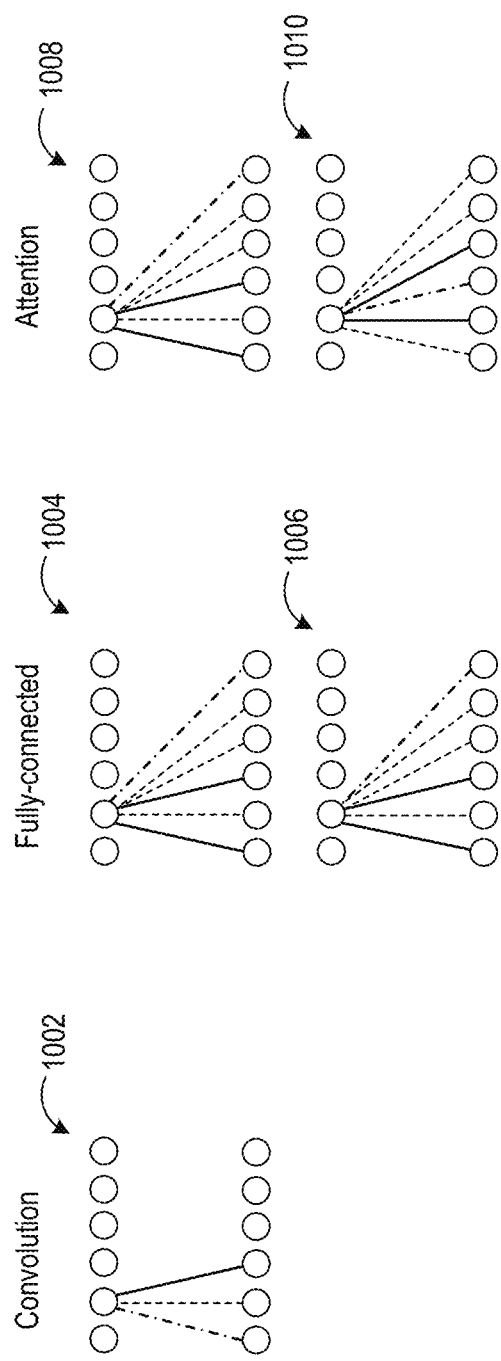
FIG. 10 shows schematic depictions of example convolutional, fully-connected, and attention neural networks.

FIG. 10 shows illustrations of example mappings representative of convolution, fully-connected, and attention neural networks. Each mapping shows a pattern of connections between an output layer (top) and an input layer (bottom). Here, connections to and from one unit in the output layer are shown for simplicity purposes. In a convolutional layer of a neural network, shown at 1002, each unit in the output layer (top) is connected to a number of nearby units in the previous input layer (bottom). In a fully-connected layer, examples of which are shown at 1004 and 1006, each unit is connected to all units of the previous layer. In contrast, in an attention layer, examples of which are shown at 1008 and 1010, each unit may be connected to units of the previous layer, with weights differing depending on the input state, as indicated by the different connection line types between 1008 and 1010. A neural attention mechanism may learn to "attend" to different parts of an input at each step of output generation.

Figure 11:
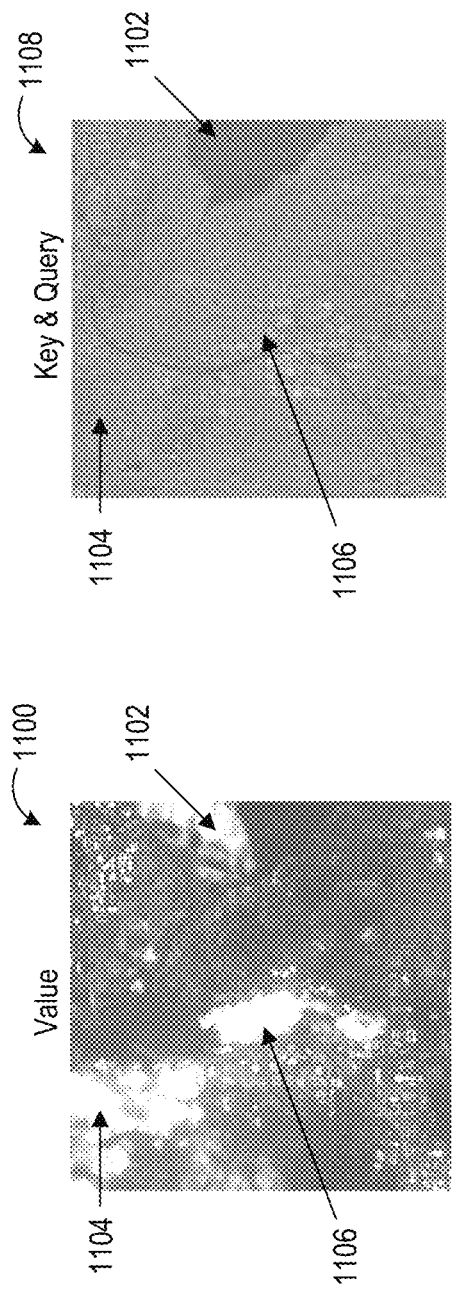
FIG. 11 shows an example representation of how an attention neural network may utilize satellite radar data along with satellite image data to help generate novel image data for occluded portions of the satellite image data.

FIG. 11 shows an example representation of how the attention mechanism may be applied to satellite image data. As examples, 1102, 1104 and 1106 indicate locations in example satellite image data 1100 that are occluded by clouds. A key and query from radar data 1108 may be used to infer a value in the optical satellite image data 1100.

While existing solutions may use either pixel replacement-based or interpolation-based methods to reconstruct images, such methods may not capture sudden changes. In contrast, the examples disclosed herein may be able to capture sudden changes due to radar being able to detect signals through clouds. The disclosed methods first use an interpolation-based method to reconstruct the radar data for missing image data, which then allows for neural attention between the radar data and the optical image data for the same day. Then, the GAN or other suitable neural network (or other suitable machine learning function) may create a radar prediction along with the optical prediction.

Figure 12:
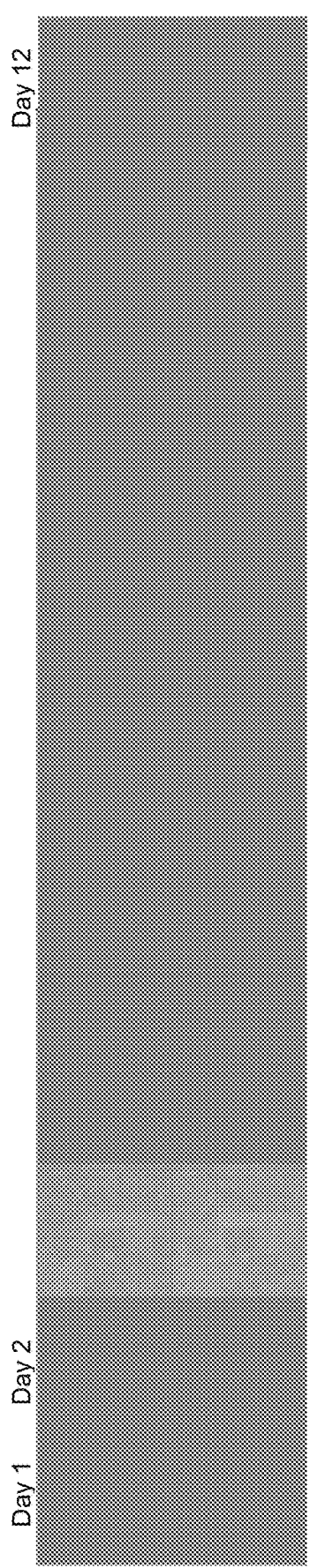
FIG. 12 shows example radar data acquired for a geographic area over a period of time.
Figure 13:
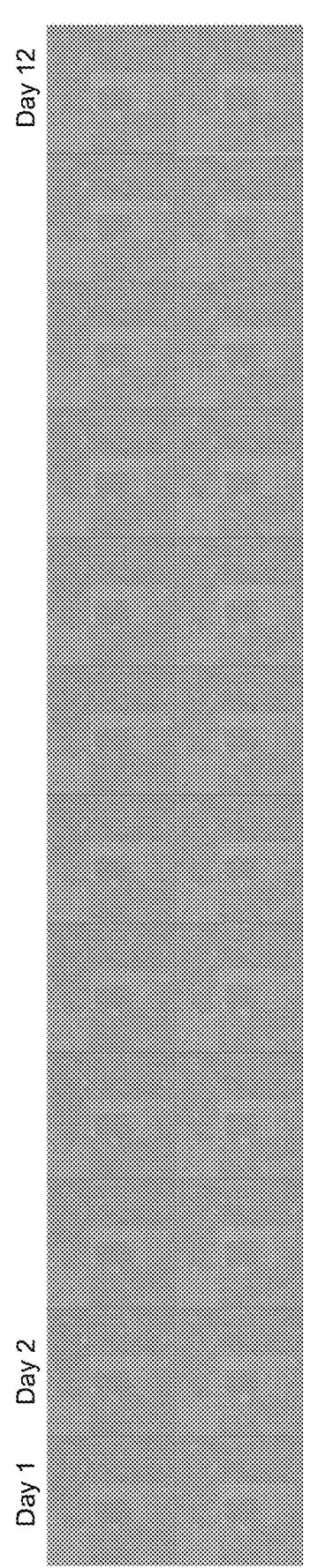
FIG. 13 shows example infilled radar data generated based upon the radar data of FIG. 7 for use in training a GAN.
Figure 14:
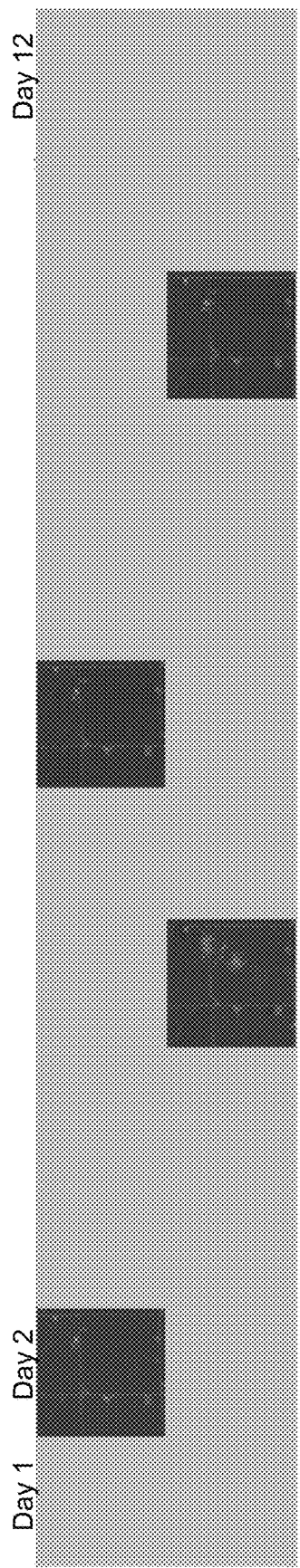
FIG. 14 shows example satellite optical image data for the geographic area of FIG. 7 over a period of time.
Figure 15:
FIG. 15 shows example masks applied to the optical images of FIG. 9 to simulate clouds to produce partial observation training data for training a GAN.
Figure 16:
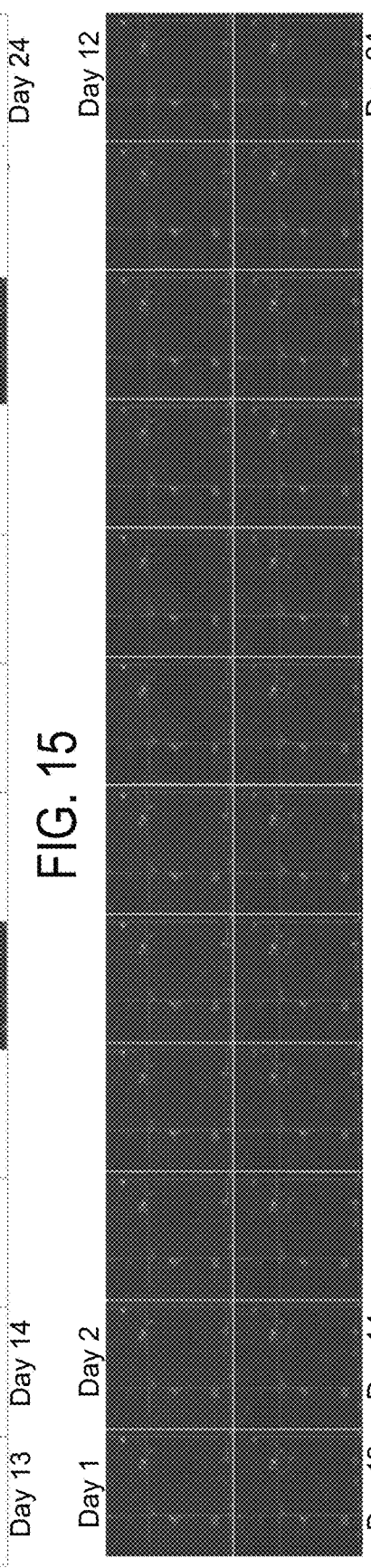
FIG. 16 shows example predicted images generated using a GAN trained with the data of FIGS. 8 and 10.

FIGS. 12-16 show example data useable for training a GAN to generate satellite optical image data in the manner described above. FIG. 12 shows example radar data of a geographic area over a period of time, the first row showing data collected from days 1-12 and the second row showing data collected from days 13-24. FIG. 13 shows the radar data infilled using interpolation to produce radar data for each day over the 24-day time period. FIG. 14 shows satellite optical image data that corresponds to the geographic area and time period of the radar data. One or more masks are then applied to the optical images of FIG. 14 to form images with synthetic clouds. Example masks are shown in FIG. 15. FIG. 16 shows predicted images that are subsequently generated based on the optical image data, the cloud masks (including their locations), and the radar data. Radar data and optical image data may be correlated through a neural attention mechanism, and POGAN may be used to fill in missing optical image data, as described above. The training process may utilize any suitable loss function.

In other examples, a machine learning function may be trained to predict images using any other suitable time frame than a 24-day period. Additionally, a machine learning function utilizing a neural attention mechanism may be used to analyze for periods of time different than that used to train the function. Further, in other examples, more than one radar image and/or optical or multispectral image per day may be used as training data.

Figure 17:
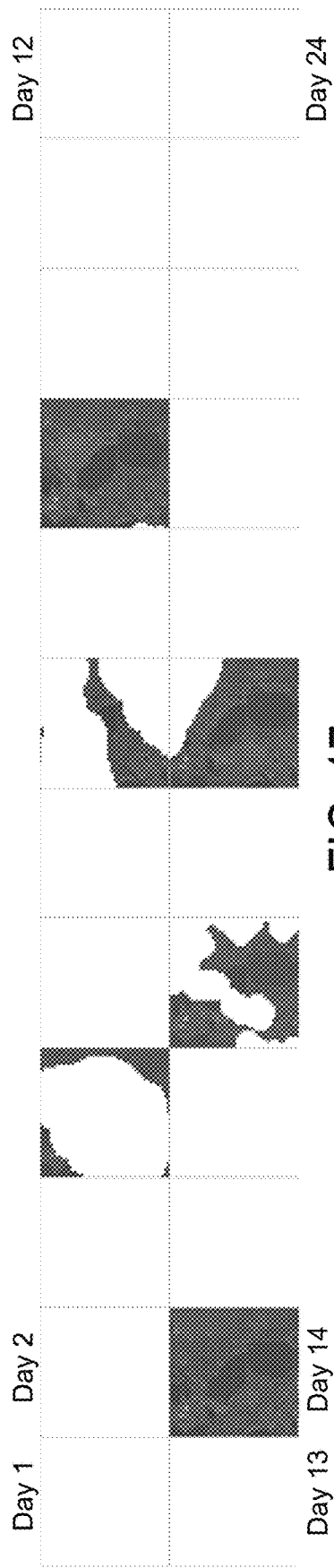
FIG. 17 shows example satellite image data of a geographic area acquired in a deployment-phase over a 24-day period, with synthetic masks shown that were applied to occlude at least some of the image data for training.
Figure 18:
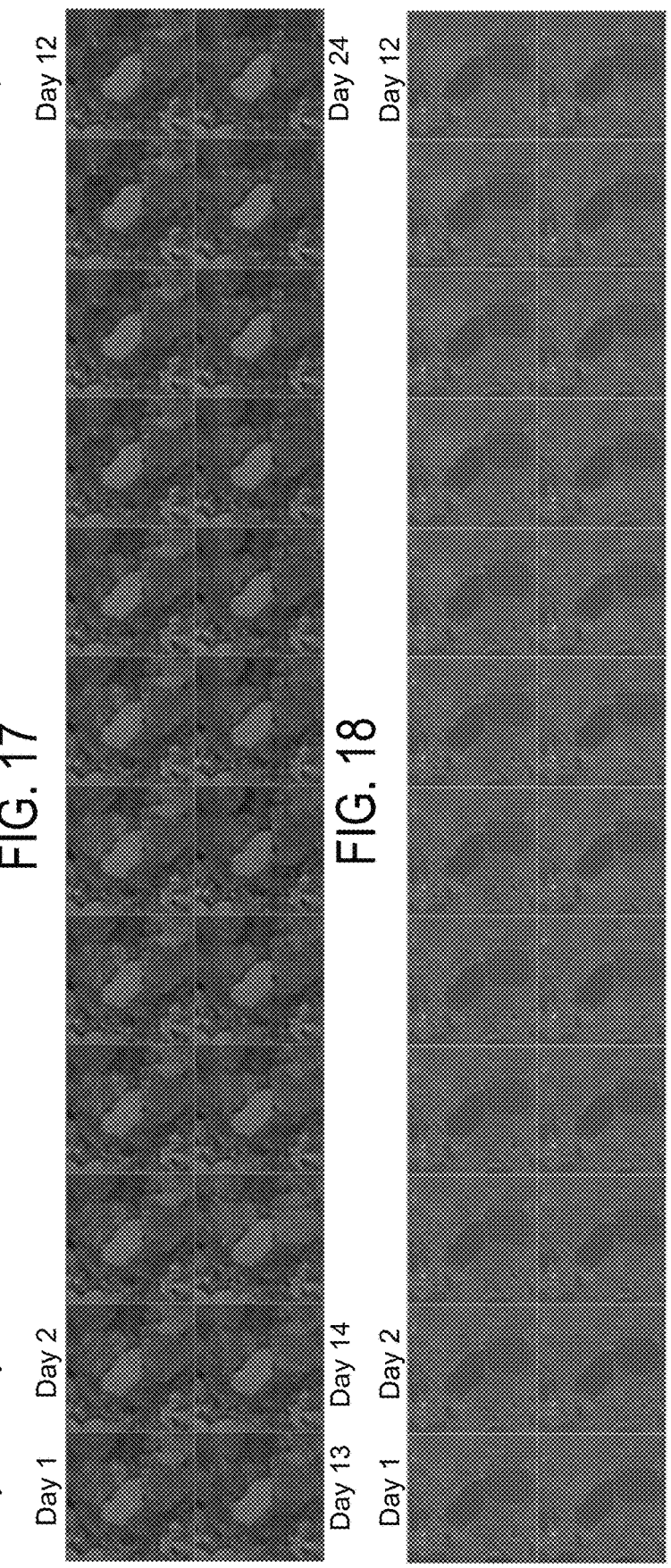
FIG. 18 shows example satellite radar data for the geographic area and 24-day period of FIG. 17, including interpolated radar data that fills in days lacking radar images.
Figure 19:
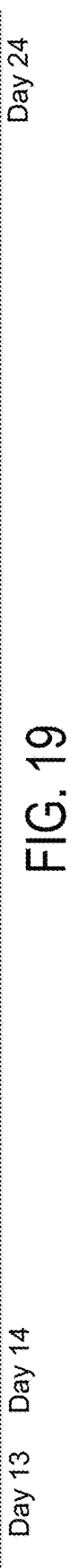
FIG. 19 shows predicted image data for the occluded or missing images in the satellite image data of FIG. 17.
Figure 20:
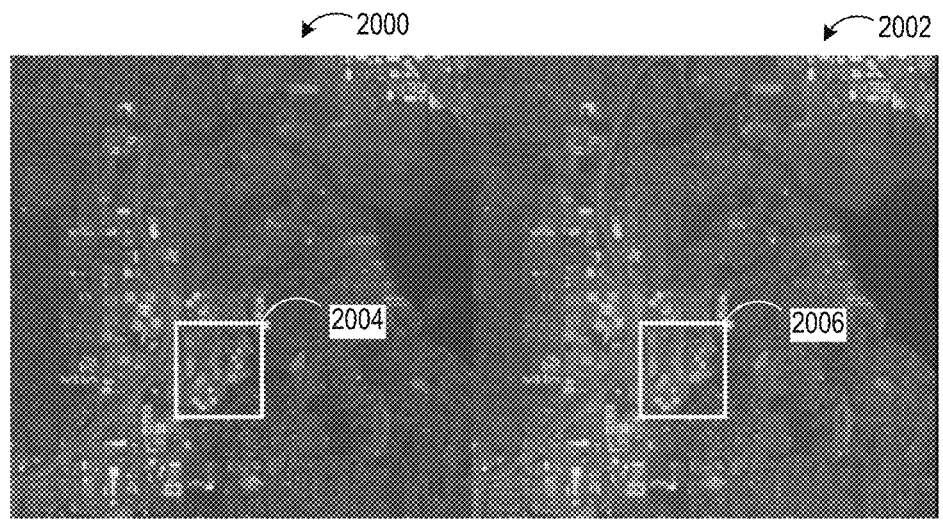
FIGS. 20-28 show example sets of acquired satellite optical image data versus generated predicted optical image data.
Figure 21:
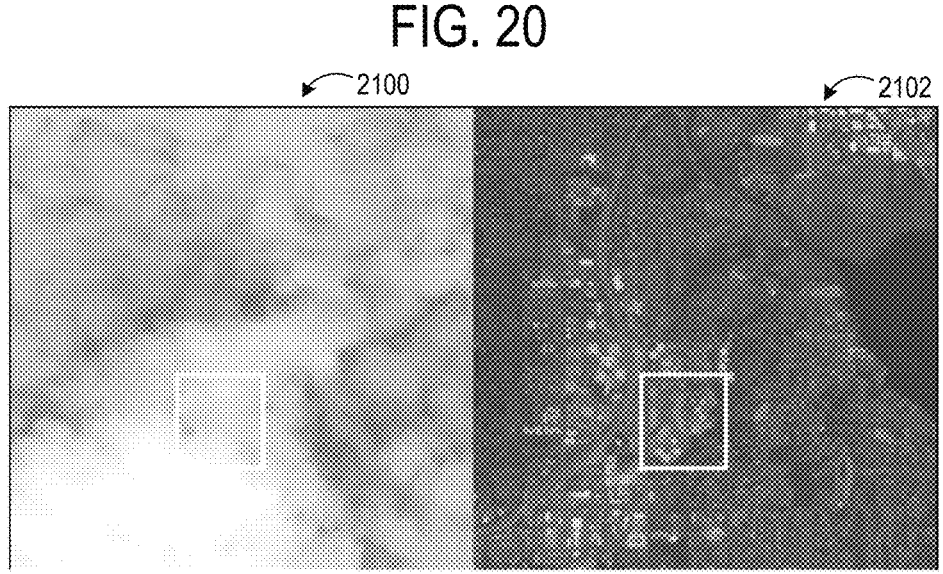
Figure 22:
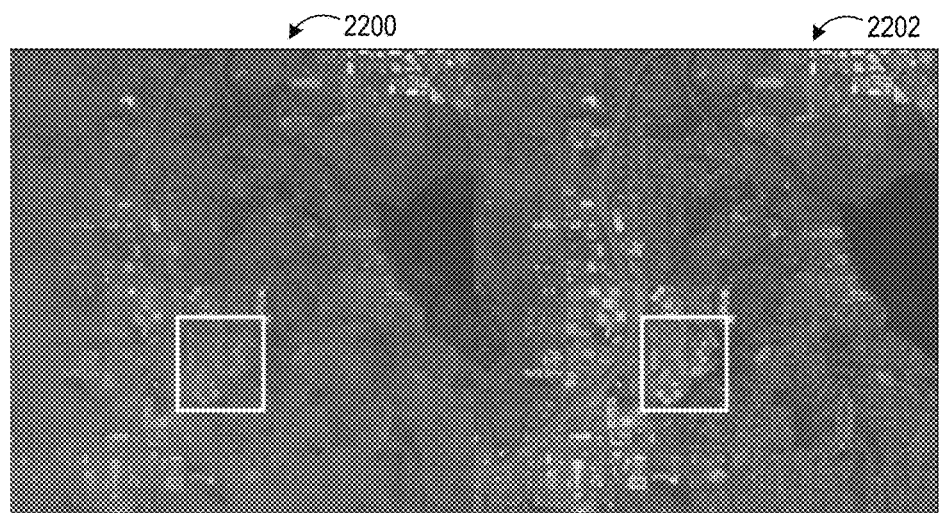
Figure 23:
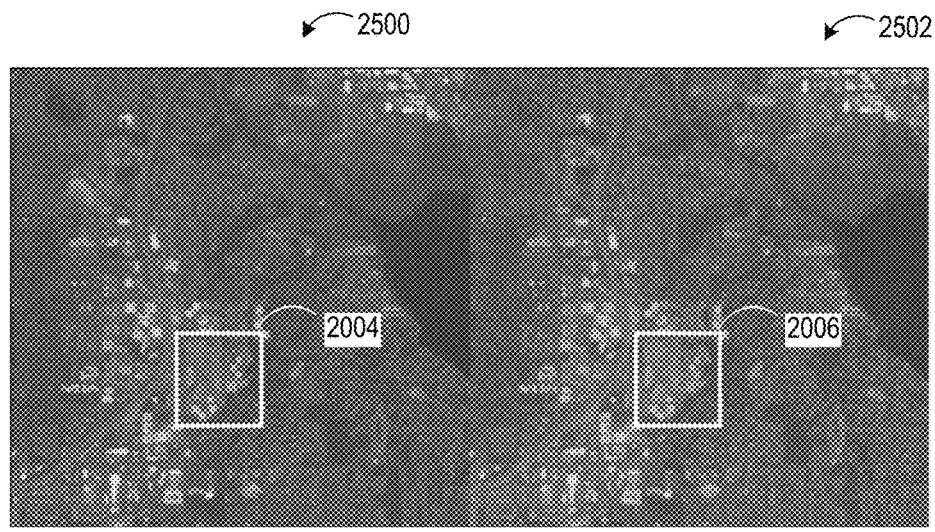
Figure 24:
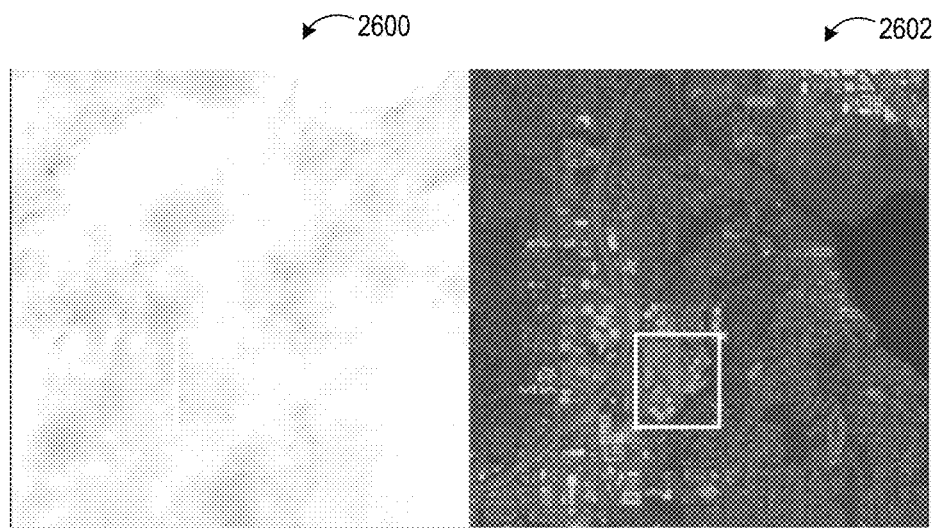
Figure 25:
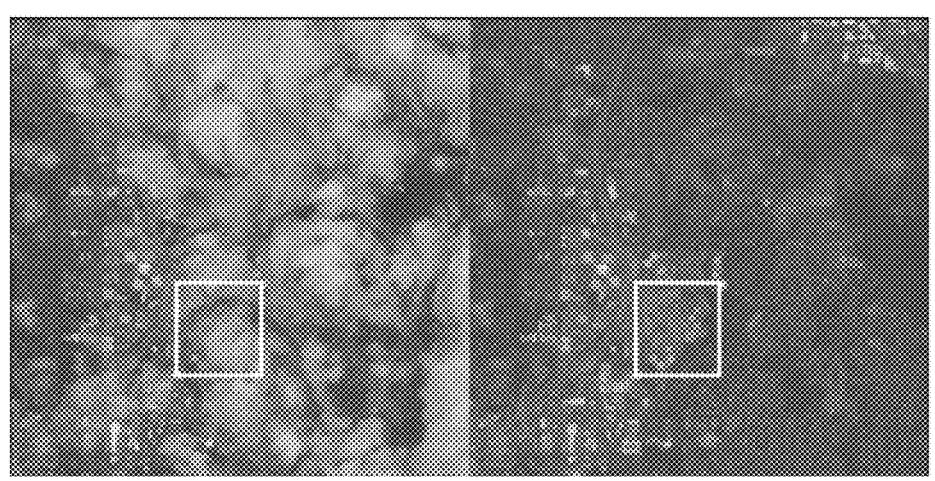
Figure 26:
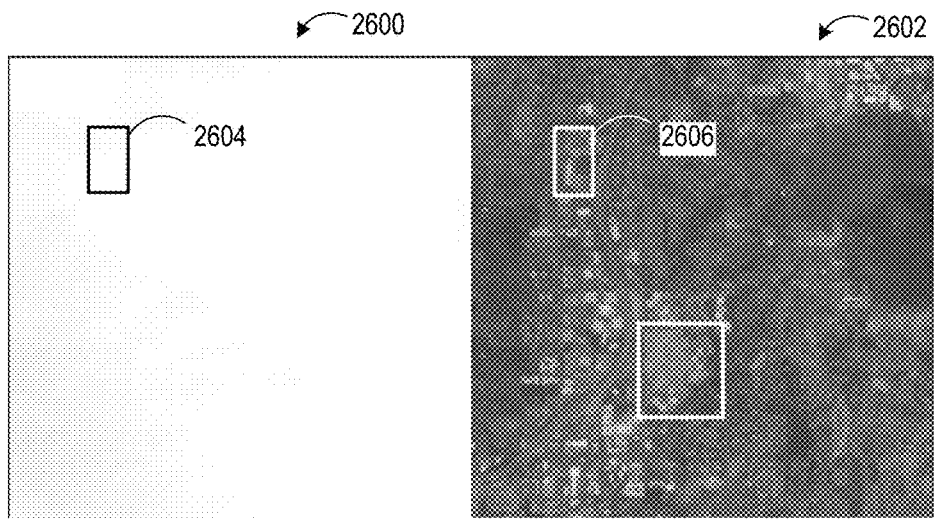

FIG. 17-19 show example deployment-phase data of a geographic area over a 24-day period, and illustrate the recovery of satellite image data using radar image data. FIG. 17 shows satellite optical image data that were collected over the period, with synthetic masks shown that were applied to occlude at least some of the image data for training. FIG. 18 shows radar data including interpolated data to provide for 24 days of data. FIG. 19 shows the resulting recovered optical image data provided by a trained machine learning model (e.g. GAN) using the optical image data of FIG. 17 and the radar data of FIG. 18. In this example, the feature vector input the GAN comprises 24 days of data, due to the GAN being trained on such a data set. As mentioned above, in other examples, any other suitable time frame may be used, including time frames greater than or less than 24 days.

Figure 27:
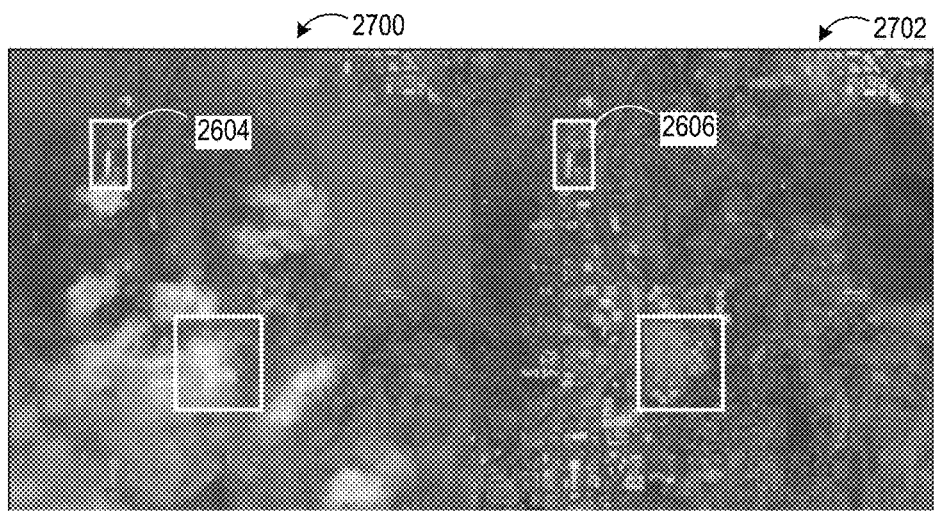
Figure 28:
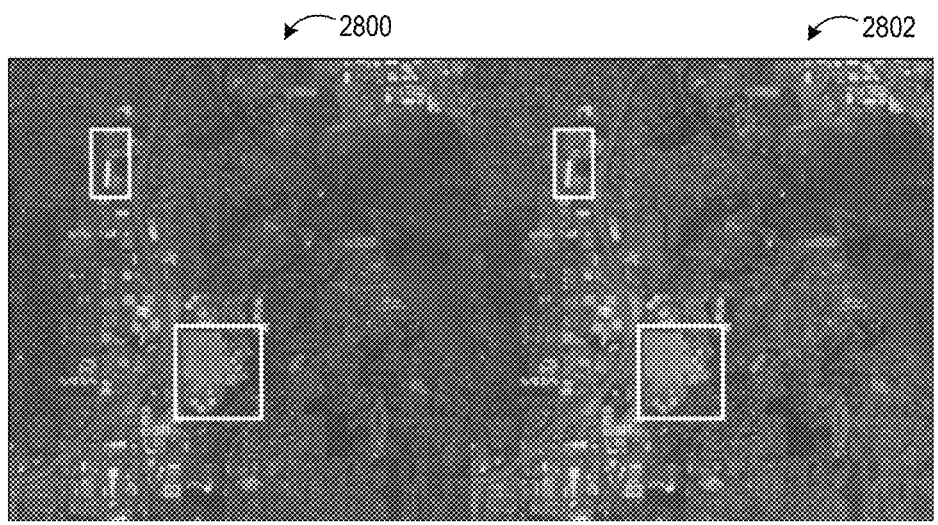
Figure 29:
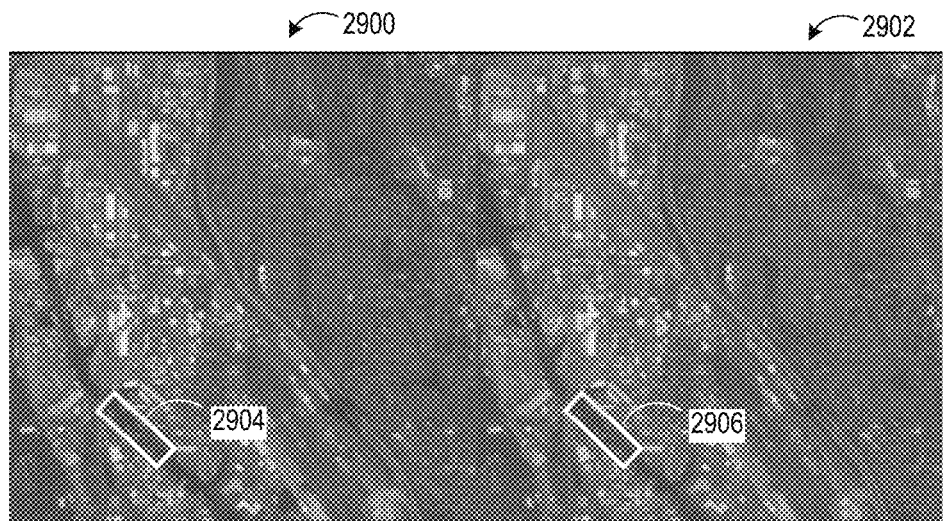
FIGS. 29-34 show additional example sets of acquired satellite optical image data versus generated predicted optical image data.
Figure 30:
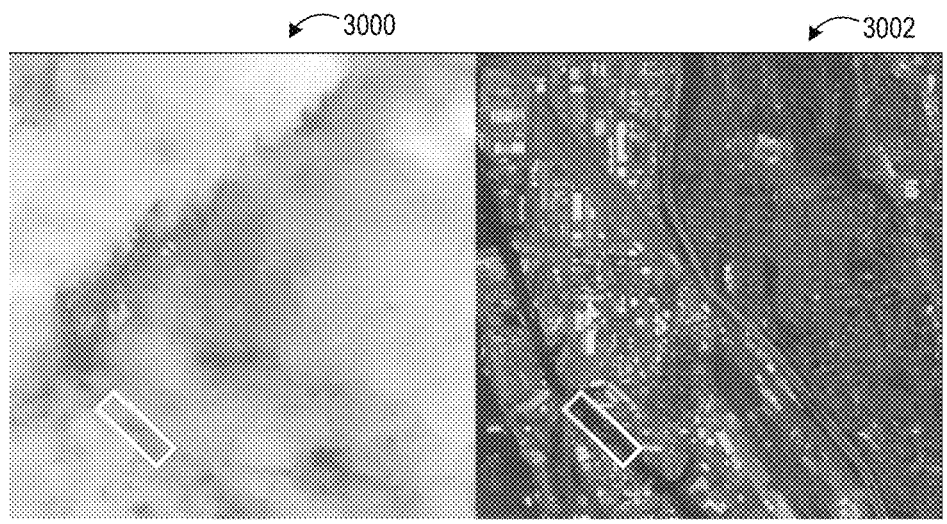
Figure 31:
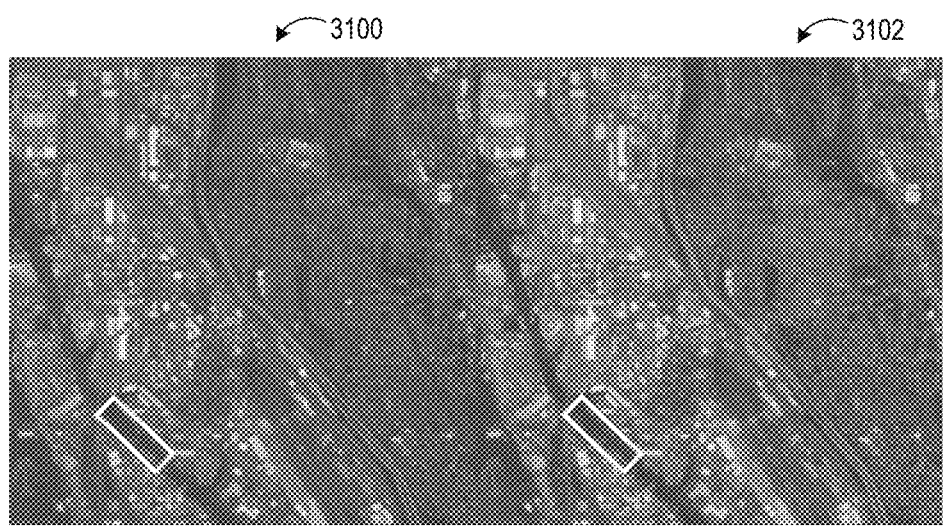
Figure 32:
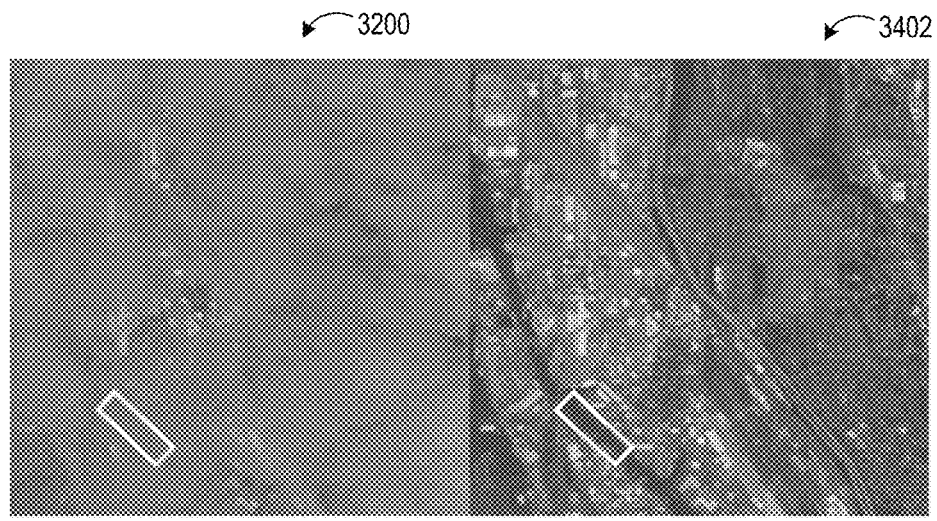
Figure 33:
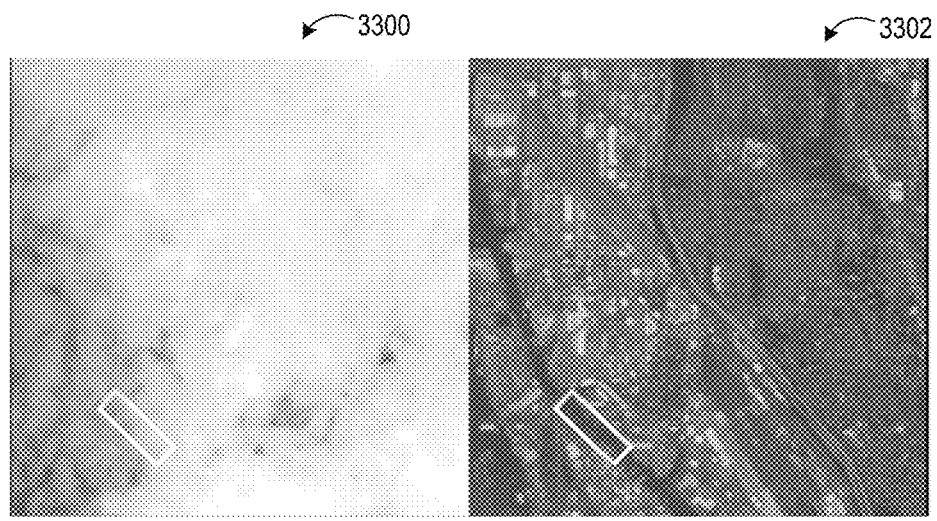
Figure 34:
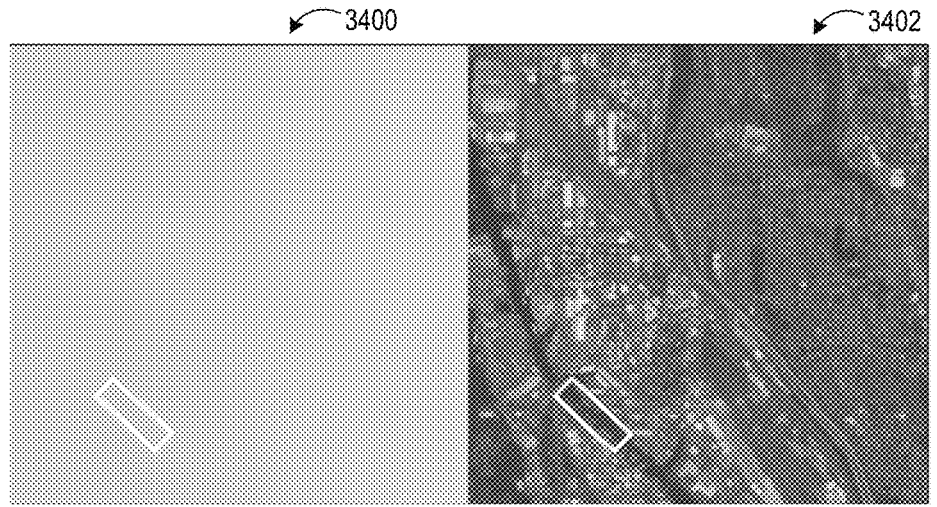

FIGS. 20-28 show example sets of occluded satellite optical image data versus recovered optical image data generated by a trained POGAN as disclosed herein based upon corresponding satellite radar data (not shown). Optical image data is shown at 2000, 2100, 2200, 2300, 2400, 2500, 2600, 2700 and 2800, while corresponding recovered is shown at 2002, 2102, 2202, 2302, 2402, 2502, 2602, 2702 and 2802. The boxed outlines 2004 and 2006 indicate a construction site that can be seen changing over time in the predicted images, even where the optical image for that day was occluded by clouds. Similarly, in FIG. 26, boxed outlines 2604 and 2606 indicate an area in which a change can be seen in the recovered optical image 2602, even though the available optical image 2600 was completely occluded by clouds. In FIG. 27, the change can be seen in the boxed outline 2604 of optical image 2700, indicating that the predicted images reflect the planet's surface relatively accurately.

FIGS. 29-34 show additional example sets of optical image data versus predicted optical image data generated by a trained POGAN as disclosed herein. The geographic area depicted here is the port of Seattle, Wash. Boxed outlines 2904 and 2906 show changes in the boats docked at port in the predicted images, even where the optical image for that day was occluded by clouds. For instance, changes in the boats docked at port can be seen in the predicted images from FIG. 32 to FIG. 33, as well as from FIG. 33 to FIG. 34, even though the corresponding optical images are mostly occluded.

Figure 35:
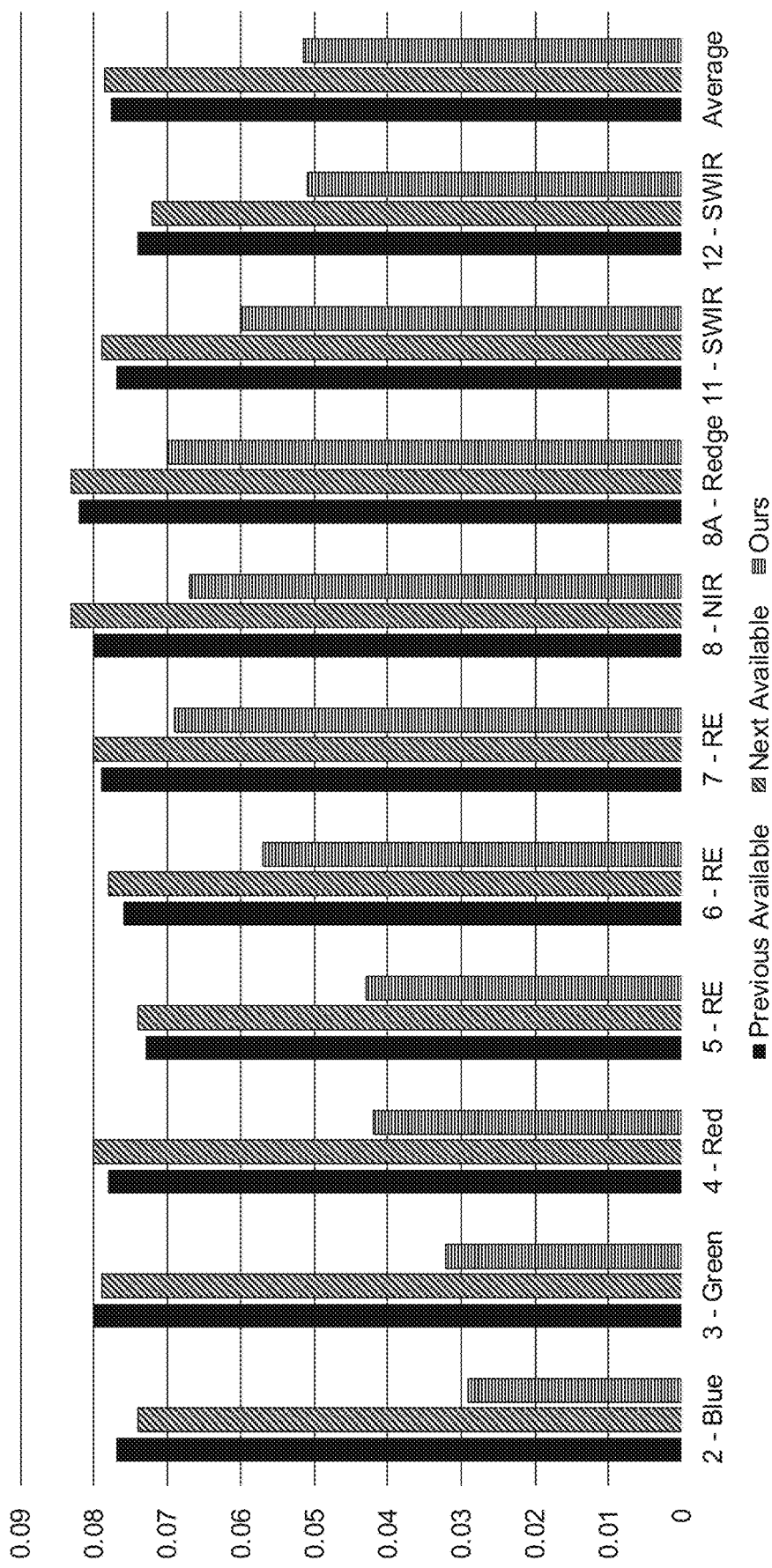
FIG. 35 shows a graph of mean absolute error of band reflectance for image data generated by the example methods disclosed herein compared to other methods.

FIG. 35 shows a graph of mean absolute error of band reflectance for experiments using the methods disclosed herein compared to other methods. The errors were determined by comparing recovered images to test images containing synthetic clouds. For the different wavelength bands, it can be seen that the mean absolute error is consistently lower for the results from utilizing the methods disclosed herein, compared to that of the other methods.

Figure 36:
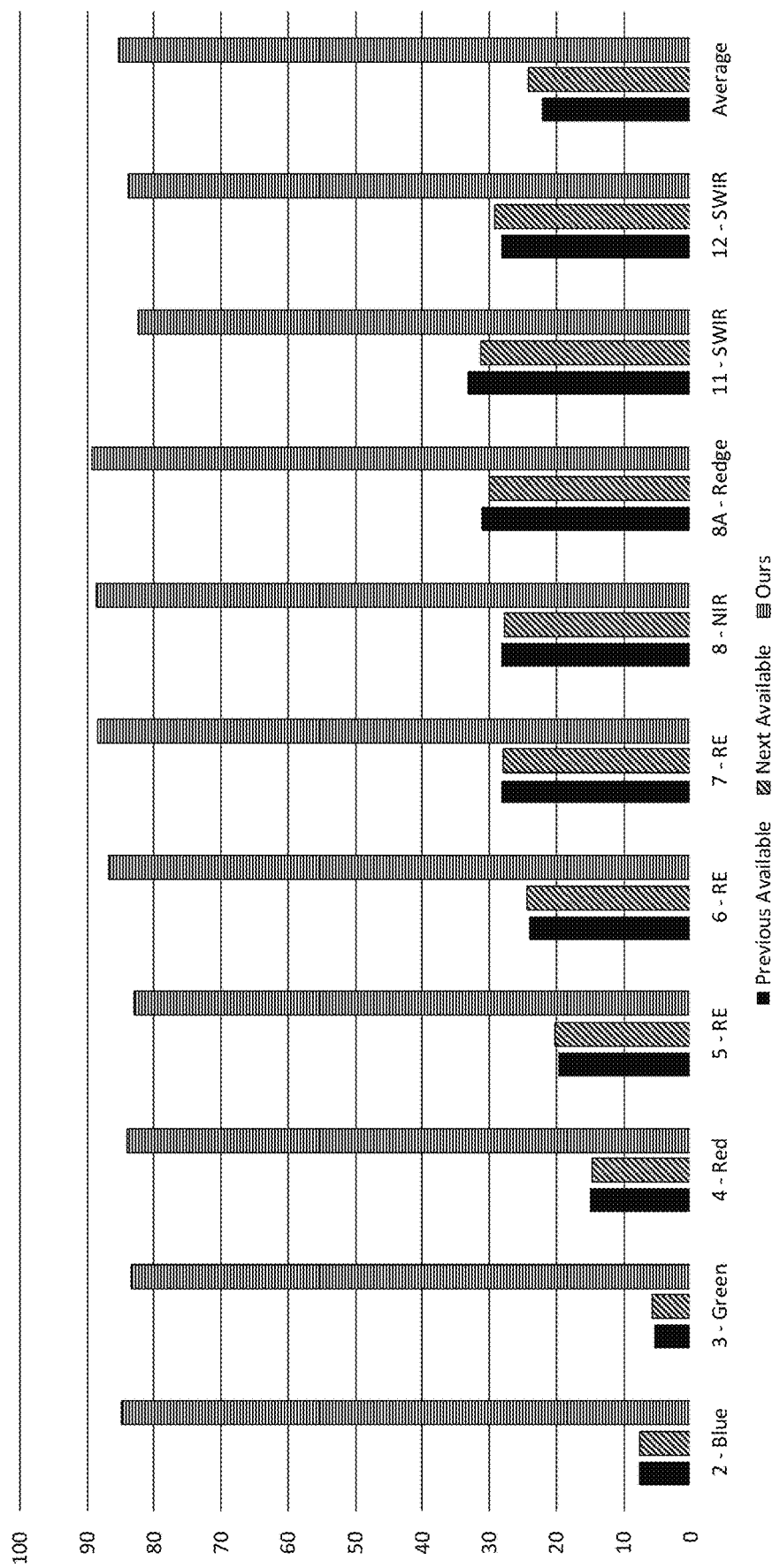
FIG. 36 shows a graph of Pearson correlation coefficients of band reflectance for image data generated by the example methods disclosed herein compared to other methods.

FIG. 36 shows a graph of Pearson correlation coefficients of band reflectance for the examples disclosed herein compared to other methods. It can be seen that the Pearson correlation coefficient is relatively higher for the results from utilizing the methods disclosed herein, compared to that of the other methods.

Any suitable satellite data may be used with the examples disclosed herein. Examples include Sentinel-1 for SAR imagery and Sentinel-2 for optical and multispectral imagery. In the experiments described above, preprocessing of the data was performed with multiple virtual machines in a cloud-based environment. Preprocessing included downloading raw satellite data from ESA, from which the data is publicly available, correcting for satellite orbit, removing border and thermal noise, computing backscatter intensity (radiometric calibration), correcting terrain (orthorectification), and aligning images across multiple satellites.

While disclosed in the context of recovering occluded satellite image data using satellite radar data, it will be understood that POGAN as disclosed herein may be applied to any suitable scenario where data may be available in one modality to understand data in another modality. Likewise, while disclosed in the context of using two modalities (satellite image data and satellite radar data), three or more modalities may be utilized in other examples.

Figure 37:
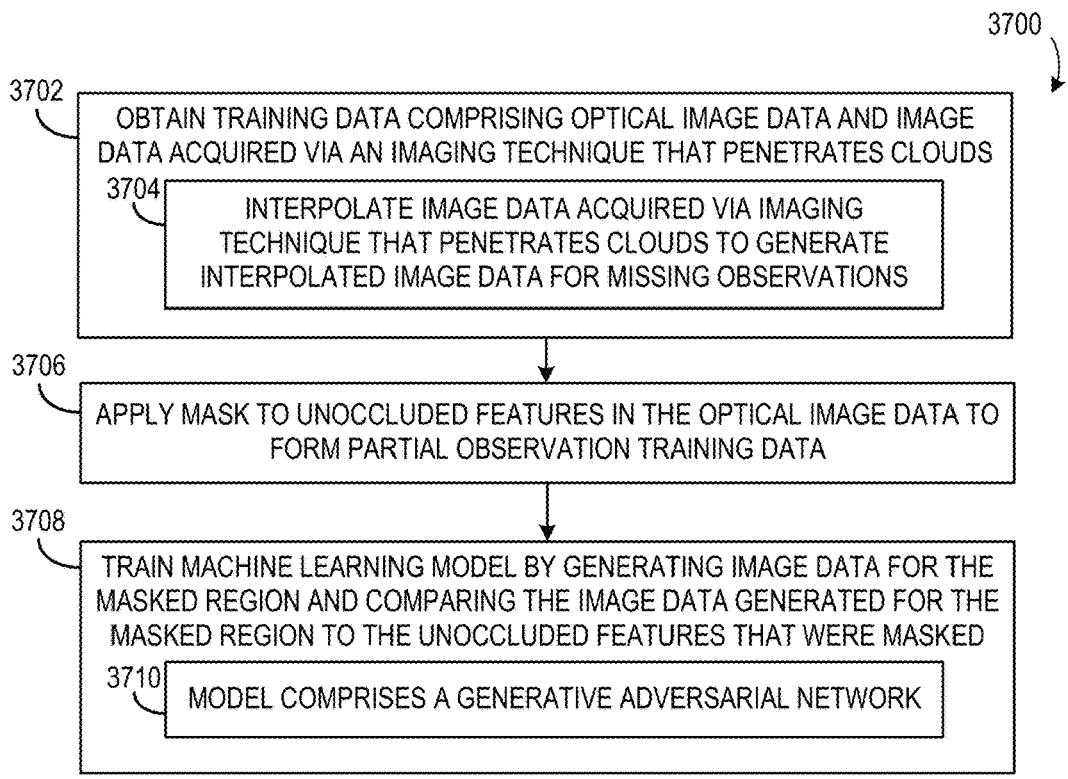
FIG. 37 shows a flow diagram depicting an example method of training a machine learning function to recover occluded image data.

FIG. 37 shows a flow diagram depicting an example method 3700 of training a machine learning function to predict image data based upon occluded image data and image data acquired via an imaging technique that penetrates clouds. Method 3700 includes, at 3702, obtaining training data comprising, for a geographical area, optical image data and image data acquired via an imaging technique that penetrates clouds. As described above, optical image data may include RGB image data, near infrared (NIR), short-wave infrared (SWIR), and Red Edge, while image data acquired via an imaging technique that penetrates clouds may include radar image data (e.g. SAR data) microwave image data, and infrared image data, as examples. The image data acquired via the imaging technique that penetrates clouds may be interpolated to generate interpolated image data for missing observations, at 3704. Continuing, method 4700 includes applying a mask to unoccluded features in the optical image data to form partial observation training data. As described above, training a machine learning model based on partial images, rather than full images, may help to decrease the risk of generating inaccurate data. This may include adding masks to simulate clouds occluding the image data. Method 3700 further includes, at 3708, training a machine learning model by generating image data for the masked region and comparing the image data generated for the masked region to the unoccluded features that were masked. Where the model comprises a GAN, at 3710, the generator and discriminator of the GAN may be trained using this data.

Figure 38:
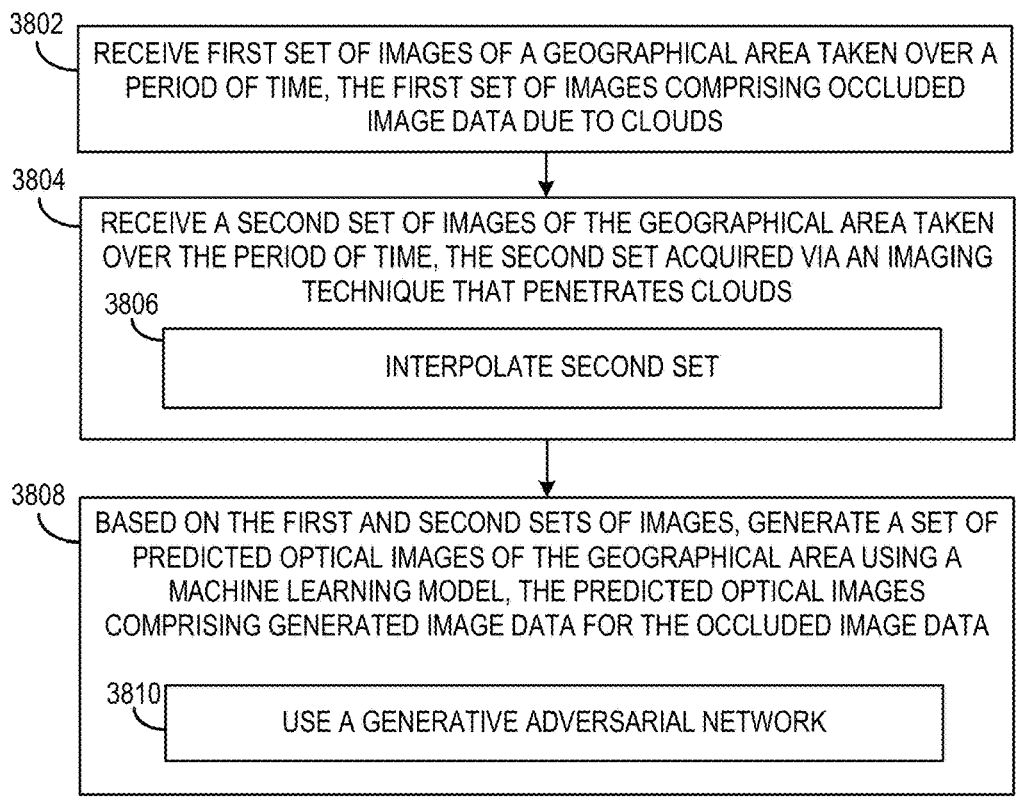
FIG. 38 shows a flow diagram depicting an example method of using a machine learning function to recover occluded image data.

FIG. 38 shows a flow diagram depicting an example method 3800 of using a machine learning function to predict image data to recover occluded image data. Method 3800 includes, at 3802, receiving a first set of images of a geographical area taken over a period of time, where the first set of images comprises occluded image data due to clouds. Method 3800 includes, at 3804, receiving a second set of images of the geographical area taken over the period of time, the second set of images acquired via an imaging technique that penetrates clouds (e.g. radar images, microwave images, infrared images). The second set of images may be interpolated, at 3806, to generate interpolated images to fill in missing observations. Method 3800 further includes, at 3808, based on the first set of images and the second set of images, generating a set of predicted optical images of the geographical area using a machine learning model. The predicted optical images include generated image data for the parts of the image data that are occluded. The prediction may be performed using a generative adversarial network, at 3810.

In some examples, the methods and processes described herein may be tied to a computing system of one or more computing devices. In particular, such methods and processes may be implemented as a computer-application program or service, an application-programming interface (API), a library, and/or other computer-program product.

Figure 39:
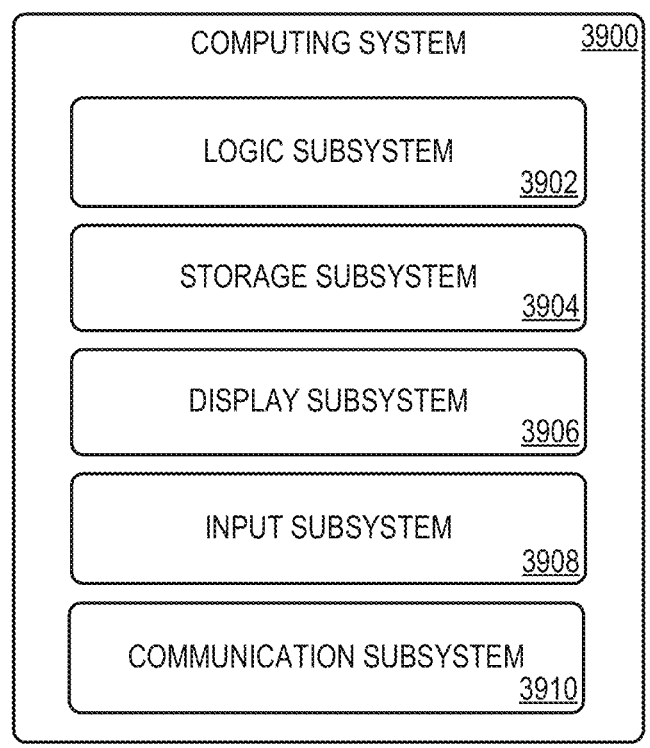
FIG. 39 shows a block diagram of an example computing system.

FIG. 39 schematically shows a non-limiting embodiment of a computing system 3900 that can enact one or more of the methods and processes described above. Computing system 3900 is shown in simplified form. Computing system 3900 may take the form of one or more personal computers, server computers, tablet computers, home-entertainment computers, network computing devices, gaming devices, mobile computing devices, mobile communication devices (e.g., smart phone), and/or other computing devices.

Computing system 3900 includes a logic subsystem 3902 and a storage subsystem 3904. Computing system 3900 may optionally include a display subsystem 3906, input subsystem 3908, communication subsystem 3910, and/or other components not shown in FIG. 39.

Logic subsystem 3902 includes one or more physical devices configured to execute instructions. For example, logic subsystem 3902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 3902 may include one or more processors configured to execute software instructions. Additionally or alternatively, logic subsystem 3902 may include one or more hardware or firmware logic machines configured to execute hardware or firmware instructions. Processors of logic subsystem 3902 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 3904 includes one or more physical devices configured to hold instructions executable by the logic subsystem 3902 to implement the methods and processes described herein. When such methods and processes are implemented, the state of storage subsystem 3904 may be transformed—e.g., to hold different data.

Storage subsystem 3904 may include removable and/or built-in devices. Storage subsystem 3904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 3904 may include volatile, nonvolatile, dynamic, static, read/write, read-only, random-access, sequential-access, location-addressable, file-addressable, and/or content-addressable devices.

It will be appreciated that storage subsystem 3904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 3902 and storage subsystem 3904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 3900 implemented to perform a particular function. In some cases, a module, program, or engine may be instantiated via logic subsystem 3902? executing instructions held by storage subsystem 3904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 3906 may be used to present a visual representation of data held by storage subsystem 3904. This visual representation may take the form of a graphical user interface (GUI). As the herein described methods and processes change the data held by the storage machine, and thus transform the state of the storage machine, the state of display subsystem 3906 may likewise be transformed to visually represent changes in the underlying data. Display subsystem 3906 may include one or more display devices utilizing virtually any type of technology. Such display devices may be combined with logic subsystem 3902 and/or storage subsystem 3904 in a shared enclosure, or such display devices may be peripheral display devices.

When included, input subsystem 3908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 3910 may be configured to communicatively couple computing system 3900 with one or more other computing devices. Communication subsystem 3910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 3900 to send and/or receive messages to and/or from other devices via a network such as the Internet.

Another example provides a system, comprising one or more processors, and storage comprising instructions executable by the one or more processors to obtain image data comprising an image with unoccluded features, apply a mask to the unoccluded features in the image to form partial observation training data comprising a masked region that obscures at least a portion of the unoccluded features, and train a machine learning model comprising a generator and a discriminator at least in part by generating image data for the masked region and comparing the image data generated for the masked region to the image with unoccluded features. The instructions may be additionally or alternatively executable to receive image data acquired via an imaging technique that penetrates clouds, and train the machine learning model by generating image data for the masked region based upon the image data acquired via the imaging technique that penetrates clouds. The image data acquired via the imaging technique that penetrates clouds may additionally or alternatively include one or more of synthetic aperture radar (SAR) image data, microwave image data, and infrared image data. The instructions may be additionally or alternatively executable to interpolate the image data acquired via the imaging technique that penetrates clouds to generate interpolated image data for training the machine learning model. The instructions may be additionally or alternatively executable to use the machine learning model to generate image data for an occluded feature in deployment-phase image data. The mask may additionally or alternatively simulate an occluding feature in deployment-phase image data. The image data may additionally or alternatively include one or more of visible satellite image data and multispectral satellite image data. The machine learning model may additionally or alternatively include a generative adversarial network (GAN). The GAN may additionally or alternatively include an attention mechanism. The image data may additionally or alternatively include an image with features occluded by clouds.

Another example provides a method comprising receiving training data comprising satellite optical images and radar image data for a geographical area, the satellite images comprising occluded image data due to clouds in the image data and also comprising unoccluded image data, applying a mask to the unoccluded image data to form partial observation training data comprising a masked region to simulate clouds blocking the unoccluded image data that is masked, and training a machine learning model comprising a generator and a discriminator at least in part by generating image data for the masked region based upon corresponding image data acquired via an imaging technique that penetrates clouds, and comparing the image data generated for the masked region with the unoccluded image data. The corresponding image data may additionally or alternatively include one or more of SAR data, microwave data, and infrared data. The machine learning model may additionally or alternatively include a GAN. The GAN may additionally or alternatively include an attention mechanism. The method may additionally or alternatively include interpolating the image data acquired via the imaging technique that penetrates clouds to generate interpolated image data for training the machine learning model. The image data may additionally or alternatively include one or more of multispectral image data and visible image data.

Another example provides a system, comprising one or more processors, storage comprising instructions executable by the one or more processors to receive a first set of images of a geographical area taken over a period of time, the first set of images comprising optical images with at least some occluded image data due to clouds, receive a second set of images of the geographical area taken over the period of time, the second set of images being acquired via an imaging technique that penetrates clouds, and based on the first set of images and the second set of images, generate a set of predicted optical images of the geographical area using a machine learning model, the set of predicted optical images comprising generated image data for the occluded image data. The machine learning model may additionally or alternatively include a GAN model comprising an attention mechanism. The second set of images may additionally or alternatively include one or more of infrared images, microwave images, and radar images. The instructions may be additionally or alternatively executable to interpolate the second set of images to generate interpolated image data for generating the set of predicted optical images.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system, comprising
   one or more processors; and
   storage comprising instructions executable by the one or more processors to:
   obtain image data comprising an image with occluded features and unoccluded features, the occluded features being occluded by clouds,
   apply a random mask as synthetic clouds to the unoccluded features in the image to form partial observation training data comprising a masked region that obscures at least a portion of the unoccluded features, and
   train a machine learning model comprising a generator and a discriminator at least in part by generating image data for the masked region and comparing the image data generated for the masked region to the unoccluded features that were masked.

2. The system of claim 1, wherein the instructions are further executable to receive image data acquired via an imaging technique that penetrates clouds, and train the machine learning model by generating image data for the masked region based upon the image data acquired via the imaging technique that penetrates clouds.

3. The system of claim 2, wherein the image data acquired via the imaging technique that penetrates clouds comprises one or more of synthetic aperture radar (SAR) image data, microwave image data, and infrared image data.

4. The system of claim 2, wherein the instructions are further executable to interpolate the image data acquired via the imaging technique that penetrates clouds to generate interpolated image data for training the machine learning model.

5. The system of claim 1, wherein the instructions are executable to use the machine learning model to generate image data for an occluded feature in deployment-phase image data.

6. The system of claim 1, wherein the random mask simulates an occluding feature in deployment-phase image data.

7. The system of claim 1, wherein the image data comprises one or more of visible satellite image data and multispectral satellite image data.

8. The system of claim 1, wherein the machine learning model comprises a generative adversarial network (GAN).

9. The system of claim 8, wherein the GAN comprises an attention mechanism.

10. The system of claim 1, wherein the image data comprises an image with features occluded by clouds.

11. A method comprising:
- receiving training data comprising satellite optical images and radar image data for a geographical area, the satellite images comprising occluded image data due to clouds in the image data and also comprising unoccluded image data,
- applying a random mask as synthetic clouds to the unoccluded image data to form partial observation training data comprising a masked region to simulate clouds blocking the unoccluded image data that is masked, and
- training a machine learning model comprising a generator and a discriminator at least in part by generating image data for the masked region based upon corresponding image data acquired via an imaging technique that penetrates clouds, and comparing the image data generated for the masked region with the unoccluded image data that were masked.

12. The method of claim 11, wherein the corresponding image data comprises one or more of SAR data, microwave data, and infrared data.

13. The method of claim 11, wherein the machine learning model comprises a GAN.

14. The method of claim 13, wherein the GAN comprises an attention mechanism.

15. The method of claim 13, further comprising interpolating the image data acquired via the imaging technique that penetrates clouds to generate interpolated image data for training the machine learning model.

16. The method of claim 11, wherein the image data comprises one or more of multispectral image data and visible image data.

* * * * *